US012580729B2

(12) United States Patent
Park et al.

(10) Patent No.: US 12,580,729 B2
(45) Date of Patent: Mar. 17, 2026

(54) ACCELERATOR GENERATING ENABLE SIGNAL

(71) Applicant: Electronics and Telecommunications Research Institute, Daejeon (KR)

(72) Inventors: Seong-Cheon Park, Daejeon (KR); Jung-Chan Na, Daejeon (KR); Hyunwoo Kim, Daejeon (KR); Suyeon Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 189 days.

(21) Appl. No.: 18/465,861

(22) Filed: Sep. 12, 2023

(65) Prior Publication Data

US 2024/0089084 A1      Mar. 14, 2024

(30) Foreign Application Priority Data

Sep. 13, 2022    (KR) ........................ 10-2022-0115212
Aug. 4, 2023    (KR) ........................ 10-2023-0102141

(51) Int. Cl.
*H04L 9/00*          (2022.01)
*H04L 9/08*          (2006.01)

(52) U.S. Cl.
CPC ............ *H04L 9/008* (2013.01); *H04L 9/0861* (2013.01)

(58) Field of Classification Search
CPC . H04L 9/008; H04L 9/0861; H04L 2209/125; G06F 7/50; G06F 7/5235; G06F 7/72; G06F 7/728; G09C 1/00
See application file for complete search history.

(56) References Cited

U.S. PATENT DOCUMENTS 9,331,851 B2      5/2016  Youn et al.
10,715,309 B2      7/2020  Khedr et al.
(Continued)

FOREIGN PATENT DOCUMENTS

KR      1020210067961 A      6/2021
KR      1020220048225 A      4/2022

OTHER PUBLICATIONS

Ahmet Can Mert et al., Medha: Microcoded Hardware Accelerator for computing on Encrypted Data, Cornell University, Oct. 11, 2022.
(Continued)

*Primary Examiner* — Vu V Tran
(74) *Attorney, Agent, or Firm* — WILLIAM PARK AND ASSOCIATES LTD.

(57) ABSTRACT

Disclosed is an accelerator which includes a first to a K-th stage performing an NTT (Number Theoretic Transform) operation of first input data including a polynomial of a homomorphic ciphertext, the first to K-th stages being connected in series, and a first assist circuit generating a first to a K-th enable signal based on a degree of the polynomial of the first input data. Each of the first to K-th stages performs a butterfly operation of the first input data or corresponding output data of a previous stage in response to that the corresponding enable signal among the first to K-th enable signals indicates a first logical value, and bypasses the first input data or the corresponding output data of the previous stage in response to that the corresponding enable signal among the first to K-th enable signals indicates a second logical value.

17 Claims, 14 Drawing Sheets

(56) References Cited

U.S. PATENT DOCUMENTS

| | | | |
|---|---|---|---|
| 11,539,504 B2 | 12/2022 | Na et al. | |
| 2003/0053625 A1* | 3/2003 | Bially | H04L 9/0631 |
| | | | 380/278 |
| 2014/0270159 A1 | 9/2014 | Youn et al. | |
| 2023/0145760 A1* | 5/2023 | Cheon | G06F 7/38 |
| | | | 708/200 |
| 2023/0171084 A1* | 6/2023 | Kwon | H04L 9/3093 |
| | | | 380/28 |

OTHER PUBLICATIONS

Mohammed Nabeel et al., CoFHEE: A Co-processor for Fully Homomorphic Encryption Execution, Cornell University, Apr. 19, 2022.

Sujoy Sinha Roy et al., Accelerator for Computing on Encrypted Data, 2021, Cryptology ePrint Archive, Paper 2021/1555.

Yang Su et al., A Highly Unified Reconfigurable Multicore Architecture to Speed Up NTT/INTT for Homomorphic Polynomial Multiplication, IEEE Transactions on Very Large Scale Integrations (VLSI) Systems, Aug. 2022, pp. 993-1006, vol. 30 No. 8.

* cited by examiner

FIG. 4

NTT Operator
[Radix-2, three stages]

FIG. 6

<NTT Table>

| N | Stage | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| $2^{16}$ | Data | 32768 | 16384 | 8192 | 4096 | 2048 | 1024 | 512 | 256 | 128 | 64 | 32 | 16 | 8 | 4 | 2 | 1 |
|  | Weight | 1 | 2 | 4 | 8 | 16 | 32 | 64 | 128 | 256 | 512 | 1024 | 2048 | 4096 | 8192 | 16384 | 32768 |
| $2^{15}$ | Data | 32768 | 16384 | 8192 | 4096 | 2048 | 1024 | 512 | 256 | 128 | 64 | 32 | 16 | 8 | 4 | 2 | 1 |
|  | Weight | x | 1 | 2 | 4 | 8 | 16 | 32 | 64 | 128 | 256 | 512 | 1024 | 2048 | 4096 | 8192 | 16384 |
| $2^{14}$ | Data | 32768 | 16384 | 8192 | 4096 | 2048 | 1024 | 512 | 256 | 128 | 64 | 32 | 16 | 8 | 4 | 2 | 1 |
|  | Weight | x | x | 1 | 2 | 4 | 8 | 16 | 32 | 64 | 128 | 256 | 512 | 1024 | 2048 | 4096 | 8192 |
| $2^{13}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | 1 | 2 | 4 | 8 | 16 | 32 | 64 | 128 | 256 | 512 | 1024 | 2048 | 4096 |
| $2^{12}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | x | 1 | 2 | 4 | 8 | 16 | 32 | 64 | 128 | 256 | 512 | 1024 | 2048 |
| $2^{11}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | x | x | 1 | 2 | 4 | 8 | 16 | 32 | 64 | 128 | 256 | 512 | 1024 |
| $2^{10}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | x | x | x | 1 | 2 | 4 | 8 | 16 | 32 | 64 | 128 | 256 | 512 |
| $2^{9}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | x | x | x | x | 1 | 2 | 4 | 8 | 16 | 32 | 64 | 128 | 256 |
| ... | ... | ... | ... | ... | ... | ... | ... | ... | ... | ... | ... | ... | ... | ... | ... | ... | ... |
| $2^{2}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | x | x | x | x | x | x | x | x | x | x | x | 1 | 2 |
| $2^{1}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | x | x | x | x | x | x | x | x | x | x | x | x | 1 |
| $2^{0}$ | Data | 32768 | 16384 | 8192 | 4096 | 2048 | 1024 | 512 | 256 | 128 | 64 | 32 | 16 | 8 | 4 | 2 | 1 |
|  | Weight | x | x | x | x | x | x | x | x | x | x | x | x | x | x | x | x |

FIG. 8

<NTT Enable Table>

| N | Enable Signal Set (EN1:EN16) | | | | | | | | | | | | | | | |
|---|---|---|---|---|---|---|---|---|---|---|---|---|---|---|---|---|
| | EN1 | EN2 | EN3 | EN4 | EN5 | EN6 | EN7 | EN8 | EN9 | EN10 | EN11 | EN12 | EN13 | EN14 | EN15 | EN16 |
| $2^{16}$ | 1 | 1 | 1 | 1 | 1 | 1 | 1 | 1 | 1 | 1 | 1 | 1 | 1 | 1 | 1 | 1 |
| $2^{15}$ | 0 | 1 | 1 | 1 | 1 | 1 | 1 | 1 | 1 | 1 | 1 | 1 | 1 | 1 | 1 | 1 |
| $2^{14}$ | 0 | 0 | 1 | 1 | 1 | 1 | 1 | 1 | 1 | 1 | 1 | 1 | 1 | 1 | 1 | 1 |
| $2^{13}$ | 0 | 0 | 0 | 1 | 1 | 1 | 1 | 1 | 1 | 1 | 1 | 1 | 1 | 1 | 1 | 1 |
| $2^{12}$ | 0 | 0 | 0 | 0 | 1 | 1 | 1 | 1 | 1 | 1 | 1 | 1 | 1 | 1 | 1 | 1 |
| $2^{11}$ | 0 | 0 | 0 | 0 | 0 | 1 | 1 | 1 | 1 | 1 | 1 | 1 | 1 | 1 | 1 | 1 |
| $2^{10}$ | 0 | 0 | 0 | 0 | 0 | 0 | 1 | 1 | 1 | 1 | 1 | 1 | 1 | 1 | 1 | 1 |
| $2^{9}$ | 0 | 0 | 0 | 0 | 0 | 0 | 0 | 1 | 1 | 1 | 1 | 1 | 1 | 1 | 1 | 1 |
| ••• | ••• | ••• | ••• | ••• | ••• | ••• | ••• | ••• | ••• | ••• | ••• | ••• | ••• | ••• | ••• | ••• |
| $2^{2}$ | 0 | 0 | 0 | 0 | 0 | 0 | 0 | 0 | 0 | 0 | 0 | 0 | 0 | 0 | 1 | 1 |
| $2^{1}$ | 0 | 0 | 0 | 0 | 0 | 0 | 0 | 0 | 0 | 0 | 0 | 0 | 0 | 0 | 0 | 1 |
| $2^{0}$ | 0 | 0 | 0 | 0 | 0 | 0 | 0 | 0 | 0 | 0 | 0 | 0 | 0 | 0 | 0 | 0 |

FIG. 11

<INTT Table>

| N | Stage | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| $2^{16}$ | Data | 1 | 2 | 4 | 8 | 16 | 32 | 64 | 128 | 256 | 512 | 1024 | 2048 | 4096 | 8192 | 16384 | 32768 |
| | Weight | 32768 | 16384 | 8192 | 4096 | 2048 | 1024 | 512 | 256 | 128 | 64 | 32 | 16 | 8 | 4 | 2 | 1 |
| $2^{15}$ | Data | 1 | 2 | 4 | 8 | 16 | 32 | 64 | 128 | 256 | 512 | 1024 | 2048 | 4096 | 8192 | 16384 | 32768 |
| | Weight | 16384 | 8192 | 4096 | 2048 | 1024 | 512 | 256 | 128 | 64 | 32 | 16 | 8 | 4 | 2 | 1 | x |
| $2^{14}$ | Data | 1 | 2 | 4 | 8 | 16 | 32 | 64 | 128 | 256 | 512 | 1024 | 2048 | 4096 | 8192 | 16384 | 32768 |
| | Weight | 8192 | 4096 | 2048 | 1024 | 512 | 256 | 128 | 64 | 32 | 16 | 8 | 4 | 2 | 1 | x | x |
| $2^{13}$ | Data | 1 | 2 | 4 | 8 | 16 | 32 | 64 | 128 | 256 | 512 | 1024 | 2048 | 4096 | 8192 | 16384 | 32768 |
| | Weight | 4096 | 2048 | 1024 | 512 | 256 | 128 | 64 | 32 | 16 | 8 | 4 | 2 | 1 | x | x | x |
| $2^{12}$ | Data | 1 | 2 | 4 | 8 | 16 | 32 | 64 | 128 | 256 | 512 | 1024 | 2048 | 4096 | 8192 | 16384 | 32768 |
| | Weight | 2048 | 1024 | 512 | 256 | 128 | 64 | 32 | 16 | 8 | 4 | 2 | 1 | x | x | x | x |
| $2^{11}$ | Data | 1 | 2 | 4 | 8 | 16 | 32 | 64 | 128 | 256 | 512 | 1024 | 2048 | 4096 | 8192 | 16384 | 32768 |
| | Weight | 1024 | 512 | 256 | 128 | 64 | 32 | 16 | 8 | 4 | 2 | 1 | x | x | x | x | x |
| $2^{10}$ | Data | 1 | 2 | 4 | 8 | 16 | 32 | 64 | 128 | 256 | 512 | 1024 | 2048 | 4096 | 8192 | 16384 | 32768 |
| | Weight | 512 | 256 | 128 | 64 | 32 | 16 | 8 | 4 | 2 | 1 | x | x | x | x | x | x |
| $2^{9}$ | Data | 1 | 2 | 4 | 8 | 16 | 32 | 64 | 128 | 256 | 512 | 1024 | 2048 | 4096 | 8192 | 16384 | 32768 |
| | Weight | 256 | 128 | 64 | 32 | 16 | 8 | 4 | 2 | 1 | x | x | x | x | x | x | x |
| ... | ... | ... | ... | ... | ... | ... | ... | ... | ... | ... | ... | ... | ... | ... | ... | ... | ... |
| $2^{2}$ | Data | 1 | 2 | 4 | 8 | 16 | 32 | 64 | 128 | 256 | 512 | 1024 | 2048 | 4096 | 8192 | 16384 | 32768 |
| | Weight | 2 | 1 | x | x | x | x | x | x | x | x | x | x | x | x | x | x |
| $2^{1}$ | Data | 1 | 2 | 4 | 8 | 16 | 32 | 64 | 128 | 256 | 512 | 1024 | 2048 | 4096 | 8192 | 16384 | 32768 |
| | Weight | 1 | x | x | x | x | x | x | x | x | x | x | x | x | x | x | x |
| $2^{0}$ | Data | 1 | 2 | 4 | 8 | 16 | 32 | 64 | 128 | 256 | 512 | 1024 | 2048 | 4096 | 8192 | 16384 | 32768 |
| | Weight | x | x | x | x | x | x | x | x | x | x | x | x | x | x | x | x |

FIG. 13

<INTT Enable Table>

Enable Signal Set (EN1:EN16)

| N | EN1 | EN2 | EN3 | EN4 | EN5 | EN6 | EN7 | EN8 | EN9 | EN10 | EN11 | EN12 | EN13 | EN14 | EN15 | EN16 |
|---|-----|-----|-----|-----|-----|-----|-----|-----|-----|------|------|------|------|------|------|------|
| $2^{16}$ | 1 | 1 | 1 | 1 | 1 | 1 | 1 | 1 | 1 | 1 | 1 | 1 | 1 | 1 | 1 | 1 |
| $2^{15}$ | 1 | 1 | 1 | 1 | 1 | 1 | 1 | 1 | 1 | 1 | 1 | 1 | 1 | 1 | 1 | 0 |
| $2^{14}$ | 1 | 1 | 1 | 1 | 1 | 1 | 1 | 1 | 1 | 1 | 1 | 1 | 1 | 1 | 0 | 0 |
| $2^{13}$ | 1 | 1 | 1 | 1 | 1 | 1 | 1 | 1 | 1 | 1 | 1 | 1 | 1 | 0 | 0 | 0 |
| $2^{12}$ | 1 | 1 | 1 | 1 | 1 | 1 | 1 | 1 | 1 | 1 | 1 | 1 | 0 | 0 | 0 | 0 |
| $2^{11}$ | 1 | 1 | 1 | 1 | 1 | 1 | 1 | 1 | 1 | 1 | 1 | 0 | 0 | 0 | 0 | 0 |
| $2^{10}$ | 1 | 1 | 1 | 1 | 1 | 1 | 1 | 1 | 1 | 1 | 0 | 0 | 0 | 0 | 0 | 0 |
| $2^{9}$ | 1 | 1 | 1 | 1 | 1 | 1 | 1 | 1 | 1 | 0 | 0 | 0 | 0 | 0 | 0 | 0 |
| ... | ... | ... | ... | ... | ... | ... | ... | ... | ... | ... | ... | ... | ... | ... | ... | ... |
| $2^{2}$ | 1 | 1 | 0 | 0 | 0 | 0 | 0 | 0 | 0 | 0 | 0 | 0 | 0 | 0 | 0 | 0 |
| $2^{1}$ | 1 | 0 | 0 | 0 | 0 | 0 | 0 | 0 | 0 | 0 | 0 | 0 | 0 | 0 | 0 | 0 |
| $2^{0}$ | 0 | 0 | 0 | 0 | 0 | 0 | 0 | 0 | 0 | 0 | 0 | 0 | 0 | 0 | 0 | 0 |

Figure 15:
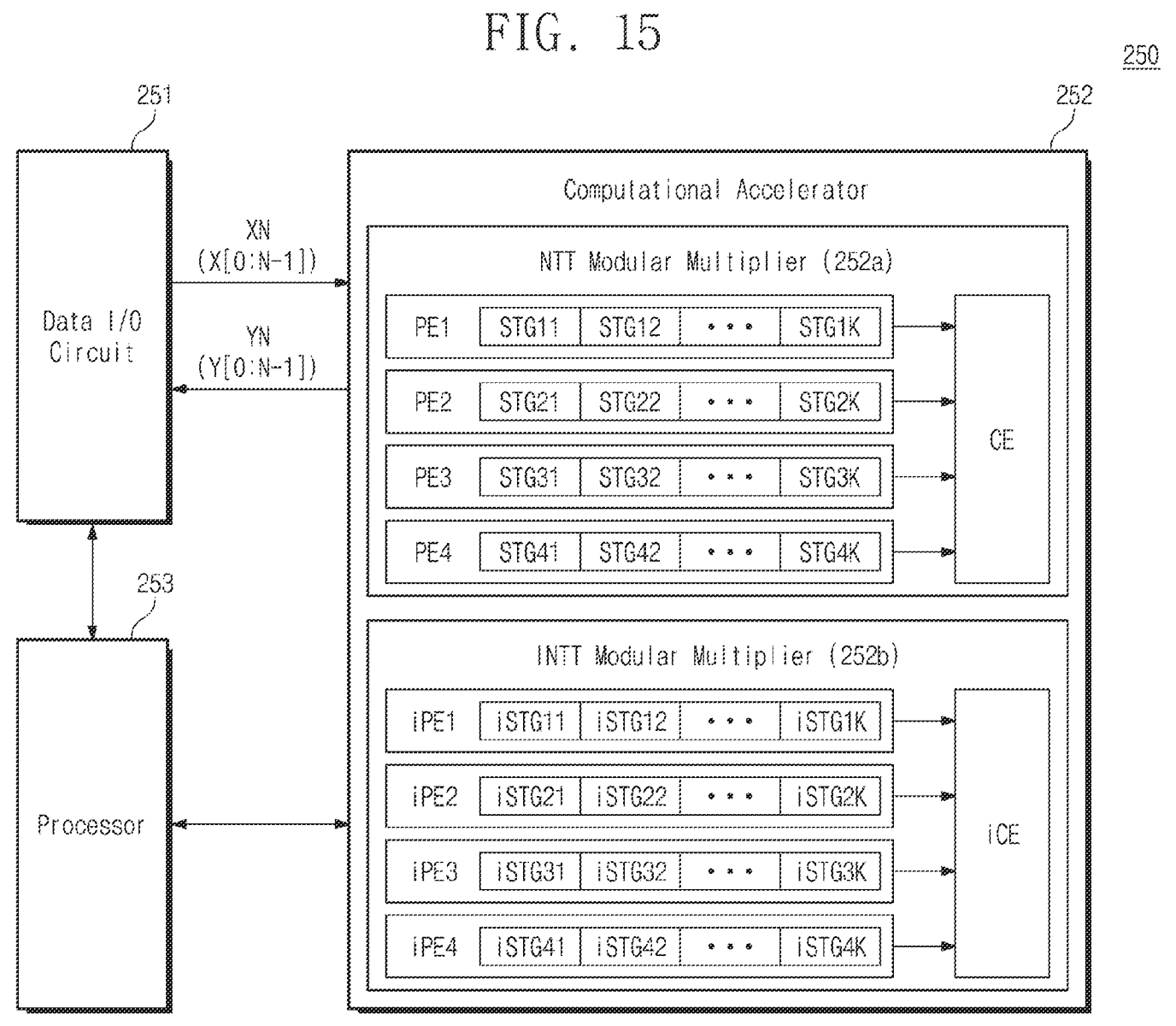

Computational Accelerator — 252

NTT Modular Multiplier (252a)

PE1 | STG11 | STG12 | ... | STG1K
PE2 | STG21 | STG22 | ... | STG2K
PE3 | STG31 | STG32 | ... | STG3K
PE4 | STG41 | STG42 | ... | STG4K

GE

INTT Modular Multiplier (252b)

iPE1 | iSTG11 | iSTG12 | ... | iSTG1K
iPE2 | iSTG21 | iSTG22 | ... | iSTG2K
iPE3 | iSTG31 | iSTG32 | ... | iSTG3K
iPE4 | iSTG41 | iSTG42 | ... | iSTG4K iCE

XN (X[0:N-1])
YN (Y[0:N-1])

251 — Data I/O Circuit

253 — Processor

ACCELERATOR GENERATING ENABLE SIGNAL

CROSS-REFERENCE TO RELATED APPLICATIONS

This application claims priority under 35 U.S.C. § 119(a) to Korean Patent Application Nos. 10-2022-0115212 filed on Sep. 13, 2022, and 10-2023-0102141 filed on Aug. 4, 2023, in the Korean Intellectual Property Office, the disclosures of which are incorporated by reference herein in their entireties.

BACKGROUND

Embodiments of the present disclosure described herein relate to a homomorphic encryption computing device, and more particularly, relate to an accelerator generating an enable signal.

A fully homomorphic encryption (FHE) device may support computations or combinations between ciphertexts in an encrypted form, that is, without decrypting data ciphertexts. The fully homomorphic encryption device may be implemented based on various algorithms such as a TFHE (Torus FHE) algorithm, a BGV (Brakerski-Gentry-Vaikuntanathan) algorithm, a BFV (Brakerski-Fan-Vercauteren) algorithm, and a CKKS (Cheon-Kim-Kim-Song) algorithm.

A homomorphic ciphertext is expressed as a higher-order polynomial. In this case, a lot of time may be required to process a multiplication operation between ciphertexts. Accordingly, to improve a computational speed of homomorphic ciphertexts, a hardware operator based on number theoretic transform (NTT) may be used. The hardware operator may be designed based on the degree of a polynomial of the homomorphic ciphertext to be processed. However, when the degree of the homomorphic ciphertext is changed, the hardware operator may fail to process the homomorphic ciphertext with the changed degree of the polynomial, or a computational resource and a power may be unnecessarily wasted.

SUMMARY

Embodiments of the present disclosure provide an accelerator generating an enable signal.

According to an embodiment, an accelerator includes a first to a K-th stage that performs an NTT (Number Theoretic Transform) operation of first input data including a polynomial of a homomorphic ciphertext, the first to K-th stages being connected in series, and a first assist circuit that generates a first to a K-th enable signal based on a degree of the polynomial of the first input data, the first to K-th enable signals respectively corresponding to the first to K-th stages. Each of the first to K-th stages performs a butterfly operation of the first input data or corresponding output data of a previous stage in response to that the corresponding enable signal among the first to K-th enable signals indicates a first logical value, and bypasses the first input data or the corresponding output data of the previous stage in response to that the corresponding enable signal among the first to K-th enable signals indicates a second logical value. The degree of the polynomial of the first input data is a natural number less than or equal to $2^K$, and K is an arbitrary natural number.

In some embodiments, the degree of the polynomial of the first input data is N, N is $2^M$, and M is an arbitrary integer more than or equal to 0 and less than or equal to K.

In some embodiments, based on the degree of the polynomial of the first input data, the first assist circuit sets each of logical values of the (K−M+1)-th to K-th enable signals among the first to K-th enable signals to the first logical value, wherein when M is 0, an enable signal having the first logical value is absent from the first to K-th enable signals, and sets each of logical values of the first to (K−M)-th enable signals among the first to K-th enable signals to the second logical value, wherein when M is K, an enable signal having the second logical value is absent from the first to K-th enable signals.

In some embodiments, the first stage among the first to K-th stages includes a first logic circuit that generates a first logic operation signal based on an AND operation of the first enable signal among the first to K-th enable signals and the first input data, a first weight buffer circuit that receives first weight data corresponding to the first input data from the first assist circuit, a first data buffer circuit that receives the first logic operation signal from the first logic circuit, a first butterfly operator that receives the first logic operation signal from the first logic circuit, receives the first weight data from the first weight buffer circuit, and generates a first butterfly operation signal corresponding to the first logic operation signal and the first weight data based on communication with the first data buffer circuit, a first bypass circuit that receives the first input data, and a first multiplexer that receives the first butterfly operation signal from the first butterfly operator and receives the first input data from the first bypass circuit. In response to that the first enable signal has the first logical value, the first multiplexer outputs the first butterfly operation signal as first output data to the second stage among the first to K-th stages. In response to that the first enable signal has the second logical value, the first multiplexer outputs the first input data as the first output data to the second stage.

In some embodiments, the second stage includes a second logic circuit that generates a second logic operation signal based on an AND operation of the second enable signal among the first to K-th enable signals and the first output data, a second weight buffer circuit that receives second weight data corresponding to the first output data from the first assist circuit, a second data buffer circuit that receives the second logic operation signal from the second logic circuit, a second butterfly operator that receives the second logic operation signal from the second logic circuit, receives the second weight data from the second weight buffer circuit, and generates a second butterfly operation signal corresponding to the second logic operation signal and the second weight data based on communication with the second data buffer circuit, a second bypass circuit that receives the first output data, and a second multiplexer that receives the second butterfly operation signal from the second butterfly operator and receives the first output data from the second bypass circuit. In response to that the second enable signal has the first logical value, the second multiplexer outputs the second butterfly operation signal as second output data to the third stage among the first to K-th stages. In response to that the second enable signal has the second logical value, the second multiplexer outputs the first output data as the second output data to the third stage.

In some embodiments, the first to K-th stages and the first assist circuit constitute an NTT modular multiplier.

In some embodiments, the accelerator further includes an NTT modular multiplier that includes a plurality of parallel processing elements generating parallel signals, respectively, and a combination element generating a combination signal based on a result of combining the parallel signals, and each of the plurality of parallel processing elements includes the first to K-th stages and the first assist circuit.

In some embodiments, the accelerator further includes a (K+1)-th to a 2K-th stage that performs an INTT (Inverse Number Theoretic Transform) operation of second input data including a polynomial of a homomorphic ciphertext, the (K+1)-th to 2K-th stages being connected in series, and a second assist circuit that generates a (K+1)-th to 2K-th enable signal based on a degree of the polynomial of the second input data, the (K+1)-th to 2K-th enable signals respectively corresponding to the (K+1)-th to 2K-th stages. Each of the (K+1)-th to 2K-th stages perform a butterfly operation of the second input data or corresponding output data of a previous stage in response to that the corresponding enable signal among the (K+1)-th to 2K-th enable signals indicates the first logical value, and bypasses the second input data or the corresponding output data of the previous stage in response to that the corresponding enable signal among the (K+1)-th to 2K-th enable signals indicates the second logical value, and the degree of the polynomial of the second input data is a natural number less than or equal to $2^K$, and In some embodiments, operations of the first to K-th stages correspond to operations of the (K+1)-th to 2K-th stages in an inverse order.

In some embodiments, the accelerator further includes an NTT modular multiplier that includes a plurality of parallel processing elements generating parallel signals, respectively, and a combination element generating a combination signal based on a result of combining the parallel signals, and an INTT modular multiplier that includes a plurality of inverse-parallel processing elements generating inverse-parallel signals, respectively, and an inverse-combination element generating an inverse-combination signal based on a result of combining the inverse-parallel signals. Each of the plurality of parallel processing elements includes the first to K-th stages and the first assist circuit, and each of the plurality of inverse-parallel processing elements includes the (K+1)-th to 2K-th stages and the second assist circuit.

According to an embodiment, an accelerator includes a first to a K-th stage that performs an INTT (Inverse Number Theoretic Transform) operation of input data including a polynomial of a homomorphic ciphertext, the first to K-th stages being connected in series, and an assist circuit that generates a first to a K-th enable signal based on a degree of the polynomial of the first input data, the first to K-th enable signals respectively corresponding to the first to K-th stages. Each of the first to K-th stages performs a butterfly operation of the input data or corresponding output data of a previous stage in response to that the corresponding enable signal among the first to K-th enable signals indicates a first logical value, and bypasses the input data or the corresponding output data of the previous stage in response to that the corresponding enable signal among the first to K-th enable signals indicates a second logical value. The degree of the polynomial of the input data is a natural number less than or equal to $2^K$, and K is an arbitrary natural number.

In some embodiments, the degree of the polynomial of the first input data is N, N is $2^M$, and M is an arbitrary integer more than or equal to 0 and less than or equal to K.

In some embodiments, based on the degree of the polynomial of the input data, the assist circuit sets each of logical values of the first to M-th enable signals among the first to K-th enable signals to the first logical value, wherein when M is 0, an enable signal having the first logical value is absent from the first to K-th enable signals, and sets each of logical values of the (M+1)-th to K-th enable signals among the first to k-th enable signals to the second logical value, wherein when M is K, an enable signal having the second logical value is absent from the first to K-th enable signals.

In some embodiments, the K-th stage among the first to K-th stages includes a K-th logic circuit that generates a K-th logic operation signal based on an AND operation of the K-th enable signal among the first to K-th enable signals and (K−1)-th output data of the (K−1)-th stage among the first to K-th stages, a K-th weight buffer circuit that receives K-th weight data corresponding to the (K−1)-th output data from the assist circuit, a K-th data buffer circuit that receives the K-th logic operation signal from the K-th logic circuit, a K-th butterfly operator that receives the K-th logic operation signal from the K-th logic circuit, receives the K-th weight data from the K-th weight buffer circuit, and generates a K-th butterfly operation signal corresponding to the K-th logic operation signal and the K-th weight data based on communication with the K-th data buffer circuit, a K-th bypass circuit that receives the (K−1)-th output data, and a K-th multiplexer that receives the K-th butterfly operation signal from the K-th butterfly operator and to receive the (K−1)-th output data from the K-th bypass circuit. In response to that the K-th enable signal has the first logical value, the K-th multiplexer outputs the K-th butterfly operation signal as K-th output data. In response to that the K-th enable signal has the second logical value, the K-th multiplexer outputs the (K−1)-th output data as the K-th output data. The K-th output data are final output data of the INTT operation of the input data.

In some embodiments, the (K−1)-th stages includes a (K−1)-th logic circuit that generates a (K−1)-th logic operation signal based on an AND operation of the (K−1)-th enable signal among the first to K-th enable signals and (K−2)-th output data of the (K−2)-th stage among the first to K-th stages, a (K−1)-th weight buffer circuit that receives (K−1)-th weight data corresponding to the (K−2)-th output data from the assist circuit, a (K−1)-th data buffer circuit that receives the (K−1)-th operation signal from the (K−1)-th logic circuit, a (K−1)-th butterfly operator that receives the (K−1)-th logic operation signal from the (K−1)-th logic circuit, receives the (K−1)-th weight data from the (K−1)-th weight buffer circuit, and generates a (K−1)-th butterfly operation signal corresponding to the (K−1)-th logic operation signal and the (K−1)-th weight data based on communication with the (K−1)-th data buffer circuit, a (K−1)-th bypass circuit that receives the (K−2)-th output data, and a (K−1)-th multiplexer that receives the (K−1)-th butterfly operation signal from the (K−1)-th butterfly operator and receives the (K−2)-th output data from the (K−1)-th bypass circuit. In response to that the (K−1)-th enable signal has the first logical value, the (K−1)-th multiplexer outputs the (K−1)-th butterfly operation signal as the (K−1)-th output data to the K-th stage. In response to that the (K−1)-th enable signal has the second logical value, the (K−1)-th multiplexer outputs the (K−2)-th output data as the (K−1)-th output data to the K-th stage.

In some embodiments, the first to K-th stages and the assist circuit constitute an INTT modular multiplier.

In an embodiment, the accelerator further includes an INTT modular multiplier that includes a plurality of inverse-parallel processing elements generating inverse-parallel signals, respectively, and an inverse-combination element generating an inverse-combination signal based on a result of combining the inverse-parallel signals, and each of the plurality of inverse-parallel processing elements includes the first to K-th stages and the assist circuit.

BRIEF DESCRIPTION OF THE FIGURES

The above and other objects and features of the present disclosure will become apparent by describing in detail embodiments thereof with reference to the accompanying drawings.

FIG. 4 is a diagram describing states of a multi-stage NTT operator according to some embodiments of the present disclosure.

FIG. 6 is a diagram illustrating an NTT table according to some embodiments of the present disclosure.

FIG. 8 is a table describing enable signals of FIG. 7, according to some embodiments of the present disclosure.

FIG. 11 is a diagram illustrating an INTT table according to some embodiments of the present disclosure.

FIG. 13 is a table describing enable signals of FIG. 12, according to some embodiments of the present disclosure.

FIG. 15 is a diagram describing a homomorphic encryption computing device according to some embodiments of the present disclosure.

DETAILED DESCRIPTION

Below, embodiments of the present disclosure will be described in detail and clearly to such an extent that one skilled in the art easily carries out the present disclosure.

Hereinafter, embodiments of the present disclosure will be described in detail with reference to accompanying drawings. In describing the present disclosure, to make the overall understanding easy, like components/elements will be marked by like reference signs/numerals in drawings, and thus, additional description will be omitted to avoid redundancy.

In the following drawings or in the detailed description, modules may be connected to any other components except for components illustrated in a drawing or described in the detailed description. Modules or components may be connected directly or indirectly. Modules or components may be connected through communication or may be physically connected.

Components that are described in the detailed description with reference to the terms "unit", "module", "layer", etc. will be implemented with software, hardware, or a combination thereof. For example, the software may be a machine code, firmware, an embedded code, or application software. For example, the hardware may include an electrical circuit, an electronic circuit, a processor, a computer, integrated circuit cores, a pressure sensor, an inertial sensor, a micro electro mechanical system (MEMS), a passive element, or a combination thereof.

Figure 1:
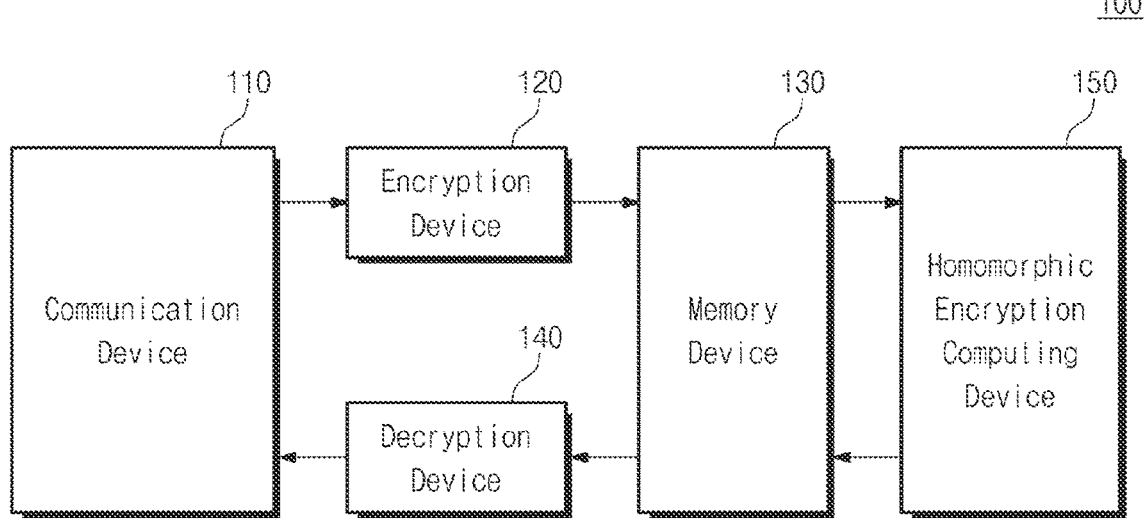
FIG. 1 is a block diagram illustrating an encryption system according to an embodiment of the present disclosure.

FIG. 1 is a block diagram illustrating an encryption system according to an embodiment of the present disclosure. Referring to FIG. 1, an encryption system 100 may include a communication device 110, an encryption device 120, a memory device 130, a decryption device 140, and a homomorphic encryption computing device 150.

In some embodiments, the encryption system 100 may be implemented with an electronic device having a wired and/or wireless communication function or may be implemented as a part of the electronic device. For example, the encryption system 100 may be implemented with at least one of a smartphone, a tablet personal computer (PC), a mobile phone, an image phone, an e-book reader, a desktop PC, a laptop PC, a netbook computer, a workstation, a server, a PDA, a portable multimedia player (PMP), an MP3 player, a camera, a wearable device, various kinds of medical devices (e.g., various kinds of portable medical measurement devices (e.g., a blood glucose monitoring device, a heartbeat measuring device, a blood pressure measuring device, and a body temperature measuring device), magnetic resonance angiography (MRA), magnetic resonance imaging (MRI), computed tomography (CT), a scanner, and an ultrasonic device), a navigation device a global navigation satellite system (GNSS), an event data recorder (EDR), a flight data recorder (FDR), a vehicle infotainment device, electronic equipment for vessel (e.g., a navigation system for vessel and a gyrocompass for vessel), avionics, a security device, a head unit for vehicle, an industrial or home robot, a drone, an automatic teller's machine (ATM), a points of sale (POS), or an internet of things (e.g., a light bulb, various kinds of sensors, a sprinkler device, a fire alarm, a thermostat, a street lamp, and exercise equipment).

The communication device 110 may allow the encryption system 100 to communicate with the outside. For example, the communication device 110 may support the wired communication connection or wireless communication connection with an external device (not illustrated). The communication device 110 may be configured to receive original (or raw) data from the external device or to provide the decrypted data to the external device.

The encryption device 120 may generate encryption data by performing an encryption operation on the original data received from the communication device 110. The encryption device 120 may store the encryption data in the memory device 130. The decryption device 140 may generate decrypted data (or original data) by performing a decryption operation on the encryption data stored in the memory device 130. The decryption device 140 may provide the decrypted data to the external device through the communication device 110.

In some embodiments, the encryption data stored in the memory device 130 may be homomorphic encryption data or a homomorphic ciphertext. For example, the encryption device 120 may generate the encryption data based on various homomorphic encryption technologies. The homomorphic encryption technology may include various schemes of encryption algorithms such as a BGV (Brakerski, Gentry, and Vaikuntanathan) algorithm, a BFV (Brakerski, Fan, and Vercauteren) algorithm, and a CKKS (Cheon, Kim, Kim and Song) algorithm. Based on the above encryption schemes, the encryption device 120 encrypts a message (or data) into the a homomorphic ciphertext in compliance with a R-LWE (Ring-Learning with Error) definition. The homomorphic ciphertext is generated through following ciphertext generation process: 1) mapping the message to an n-order polynomial pair to generate a message polynomial, 2) adding an error value called an "error polynomial" to the message polynomial, and 3) including an encryption key polynomial in the message polynomial. Herein, "N" is an arbitrary natural number. The BGV scheme, the BFV scheme, and the CKKS scheme are similar in that there is used a ciphertext expressed by a higher-order, that is, n-order polynomial but define different homomorphic operations. A bit position of a bit indicating an error value added in the process of generating a homomorphic ciphertext is differently determined for each encryption scheme in a bit stream constituting the homomorphic ciphertext. Due to the above characteristic, the BGV scheme, the BFV scheme, and the CKKS scheme define different homomorphic operations. The above homomorphic encryption algorithms are provided only as an example, and the present disclosure is not limited thereto.

As described above, the encryption data stored in the memory device 130 may be homomorphic encryption data or a homomorphic ciphertext. In some embodiments, the result of computation between homomorphic ciphertexts has the same characteristic as the result of computation between original texts. That is, because there is no need to decrypt the ciphertext for the computation between ciphertexts, it is possible to process a ciphertext more quickly. In some embodiments, the computation between homomorphic ciphertexts or the homomorphic operation may include an encryption operation, a decryption operation, a homomorphic multiplication operation, a modular operation, a relinearization operation, a key switching operation, and a modulus switching operation.

The encryption operation and the decryption operation may be homomorphic operations that are performed by a device such as a client. The homomorphic multiplication operation, the modular operation, the relinearization operation, the key switching operation, and the modulus switching operation may be homomorphic operations that are performed by a device such as a cloud server.

The homomorphic encryption computing device 150 may be configured to receive the encryption data from the memory device 130 and to perform the homomorphic encryption operation on the encryption data. In some embodiments, the homomorphic ciphertext of the encryption data may be expressed by a higher-order polynomial. In this case, the multiplication operation between the higher-order polynomials may be performed through computational hardware that is based on an NTT (number theoretic transform) algorithm. However, because the homomorphic ciphertext is a very higher-order polynomial, the hardware supporting the multiplication operation associated with the homomorphic ciphertext is not yet practical.

For example, the homomorphic ciphertext may include a higher-order polynomial, but the degree of the homomorphic ciphertext may be variable. When the degree of the homomorphic ciphertext is changed, the homomorphic encryption computing device 150 may fail to perform the encryption operation on the homomorphic ciphertext with the changed degree of the polynomial, or a computational resource and a power may be unnecessarily wasted to perform the homomorphic encryption operation.

The homomorphic encryption computing device 150 according to an embodiment of the present disclosure may provide an efficient computing method for the homomorphic encryption operation that is performed with respect to data (or encryption data) including the homomorphic ciphertext. The homomorphic encryption computing device 150 may support an operation optimized for the homomorphic ciphertext by selectively enabling stages for the homomorphic encryption operation depending on the degree of the homomorphic ciphertext. A structure and an operation of the homomorphic encryption computing device 150 according to an embodiment of the present disclosure will be described in detail with reference to the following drawings.

Figure 2:
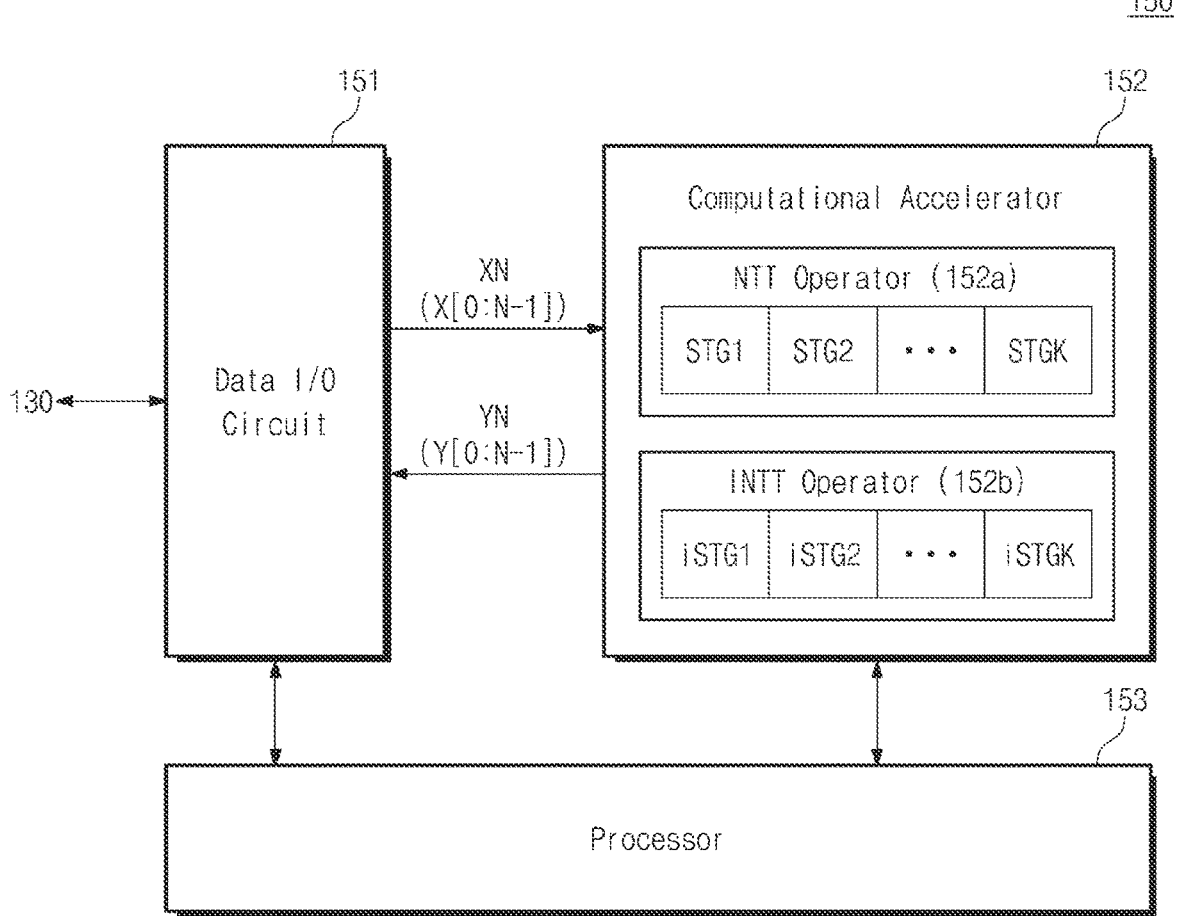
FIG. 2 is a block diagram illustrating a homomorphic encryption computing device of FIG. 1, according to some embodiments of the present disclosure.

FIG. 2 is a block diagram illustrating a homomorphic encryption computing device of FIG. 1, according to some embodiments of the present disclosure. Referring to FIGS. 1 and 2, the homomorphic encryption computing device 150 may include a data input/output (I/O) circuit 151, a computational accelerator 152, and a processor 153.

The data I/O circuit 151 may communicate data with the memory device 130. For example, the data I/O circuit 151 may receive encryption data (e.g., a homomorphic ciphertext) from the memory device 130 or may provide computational data (e.g., computational data obtained by the homomorphic encryption operation) to the memory device 130.

The computational accelerator 152 may receive input data XN from the data I/O circuit 151. The input data XN may include a polynomial of the homomorphic ciphertext. The degree of the polynomial of the homomorphic ciphertext of the input data XN may be "N". Herein, "N" is an arbitrary natural number. The input data XN may include N input data elements $X[0:N-1]$. The input data XN may be also referred to as "homomorphic encryption data" or a "homomorphic ciphertext".

The computational accelerator 152 may generate output data YN based on the homomorphic encryption operation of the input data XN. The homomorphic encryption operation may include an NTT (Number Theoretic Transform) operation and an INTT (Inverse Number Theoretic Transform) operation. The output data YN may correspond to a result of the homomorphic encryption operation of the input data XN. The degree of the polynomial of the ciphertext corresponding to the output data YN may be "N". The output data YN may include N output data elements $Y[0:N-1]$.

The computational accelerator 152 may provide the output data YN to the data I/O circuit 151. The data I/O circuit 151 may provide the output data YN to the memory device 130.

In some embodiments, the computational accelerator 152 may support an efficient NTT operation. For example, the computational accelerator 152 may include an NTT operator 152a. The NTT operator 152a may include first to K-th stages STG1 to STGK connected in series. The first to K-th stages STG1 to STGK may perform the NTT operation of the input data XN. The NTT operator 152a may efficiently perform the NTT operation of the input data XN by selectively enabling the first to K-th stages STG1 to STGK depending on the degree (i.e., N) of the input data XN. Herein, "K" is an arbitrary natural number. In an embodiment, "N" may be $2^K$. The NTT operator 152a will be described in detail with reference of FIGS. 3 to 9.

In some embodiments, the NTT operator 152a may have a structure of an SDF (Single-Path Delay Feedback)-based NTT hardware operator. Each of the first to K-th stages STG1 to STGK of the NTT operator 152a may have a Radix-R structure. For example, when the Radix "R" is "2" and the NTT operator 152a includes 8 stages STG1 to STG8, the NTT operator 152a may perform the NTT homomorphic encryption operation on the degree 256 ($=2^8$) polynomial.

In some embodiments, the computational accelerator 152 may support an efficient INTT operation. For example, the computational accelerator 152 may include an INTT operator 152$b$. The INTT operator 152$b$ may include first to K-th stages iSTG1 to iSTGK connected in series. The first to K-th stages iSTG1 to iSTGK may perform the INTT operation of the input data XN. The INTT operator 152$b$ may efficiently perform the INTT operation of the input data XN by selectively enabling the first to K-th stages iSTG1 to iSTGK depending on the degree (i.e., N) of the input data XN. Herein, "K" is an arbitrary natural number. In an embodiment, "N" may be $2^K$. The INTT operator 152$b$ will be described in detail with reference of FIGS. 10 to 14.

In some embodiments, the INTT operator 152$b$ may have a structure of an SDF-based INTT hardware operator. Each of the first to K-th stages iSTG1 to iSTGK of the INTT operator 152$b$ may have a Radix-R structure. For example, when the Radix "R" is "2" and the INTT operator 152$b$ includes 8 stages iSTG1 to iSTG8, the INTT operator 152$b$ may perform the INTT homomorphic encryption operation on the degree 256 ($=2^8$) polynomial.

The processor 153 may control an overall operation of the homomorphic encryption computing device 150. For example, the processor 153 may control the operations of the data I/O circuit 151 and the computational accelerator 152. In some embodiments, the processor 153 may provide weight data for the NTT operation and the INTT operation to the computational accelerator 152.

Figure 3:
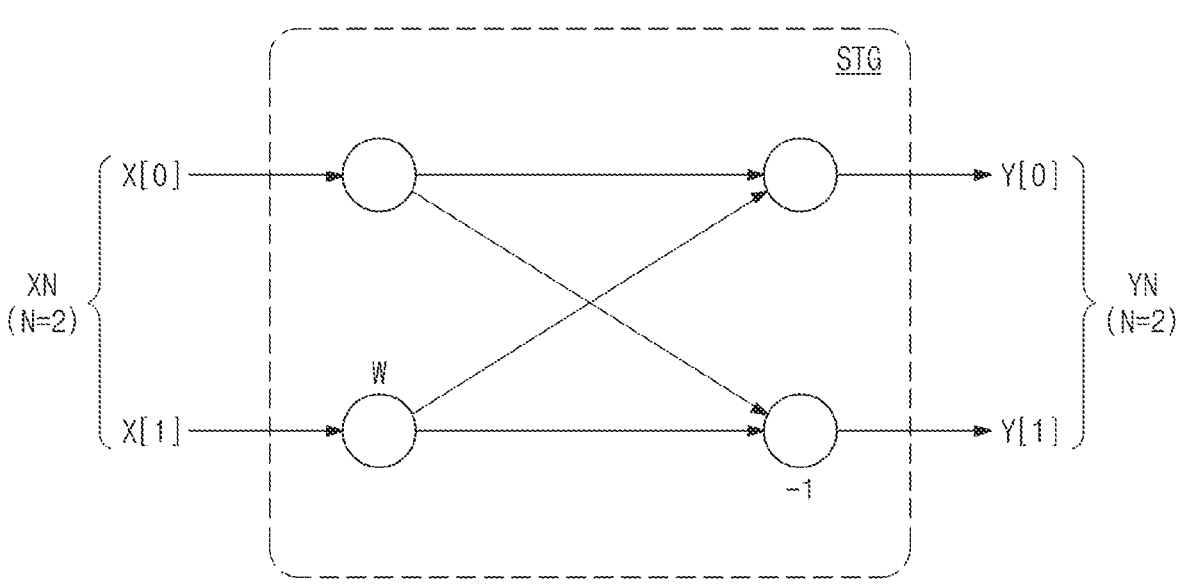
FIG. 3 is a diagram describing a single-stage NTT (Number Theoretic Transform) operator according to some embodiments of the present disclosure.

FIG. 3 is a diagram describing a single-stage NTT operator according to some embodiments of the present disclosure. Referring to FIG. 3, an NTT operator may include one Radix-2 stage. The NTT operator may correspond to the NTT operator 152$a$ of FIG. 2. In this case, the NTT operator may include a stage STG. The stage STG may have a Radix-2 structure. In the input data XN, the degree (i.e., N) of the polynomial may be "2". The input data XN may include input data elements X[0] and X[1].

The stage STG of the NTT operator may generate output data elements Y[0] and Y[1] based on an operation of the input data elements X[0] and X[1] and weight data "W". The output data elements Y[0] and Y[1] may be collectively referred to as "output data YN". The output data element Y[0] may be obtained by an operation of "X[0]+X[1]*W". The output data element Y[1] may be obtained by an operation of "X[0]–X[1]*W". The operations of the input data elements X[0] and X[1] and the weight data "W" may be also referred to as a "butterfly operation".

Figure 4:
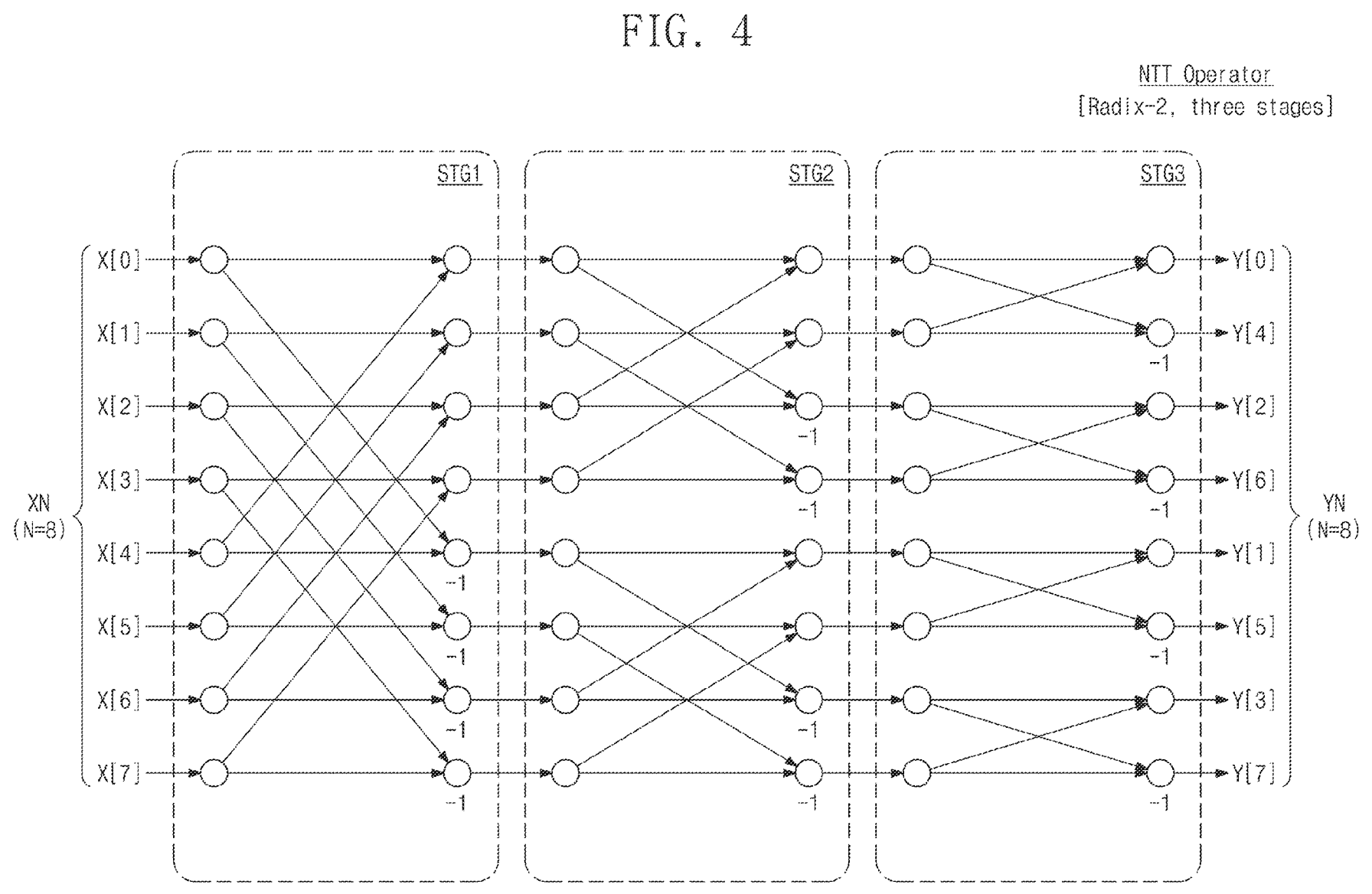

FIG. 4 is a diagram describing states of a multi-stage NTT operator according to some embodiments of the present disclosure. Referring to FIG. 4, an NTT operator may include three Radix-2 stages. The NTT operator may correspond to the NTT operator 152$a$ of FIG. 2. In this case, the NTT operator may include the first to third stages STG1 to STG3 connected in series. Each of the first to third stages STG1 to STG3 may have a Radix-2 structure. In the input data XN, the degree (i.e., N) of the polynomial may be "8". The input data XN may include input data elements X[0:7].

The first stage STG1 of the NTT operator may receive the input data elements X[0:7] and corresponding weight data and may generate 8 output data elements based on the butterfly operation of the input data elements X[0:7] and the corresponding weight data. The 8 output data elements may be collectively referred as "output data of the first stage STG1". The output data of the first stage STG1 may be provided to the second stage STG2 as input data of the second stage STG2.

As in the above description, the second stage STG2 of the NTT operator may generate output data based on the butterfly operation of the data received from the first stage STG1 and corresponding weight data. The output data of the second stage STG2 may be provided to the third stage STG3 as input data of the third stage STG3. The third stage STG3 of the NTT operator may generate the output data YN based on the butterfly operation of the data received from the second stage STG2 and corresponding weight data. The output data YN may include the output data elements Y[0:7]. The output data YN may be final output data of the NTT operation of the input data XN.

Figure 5:
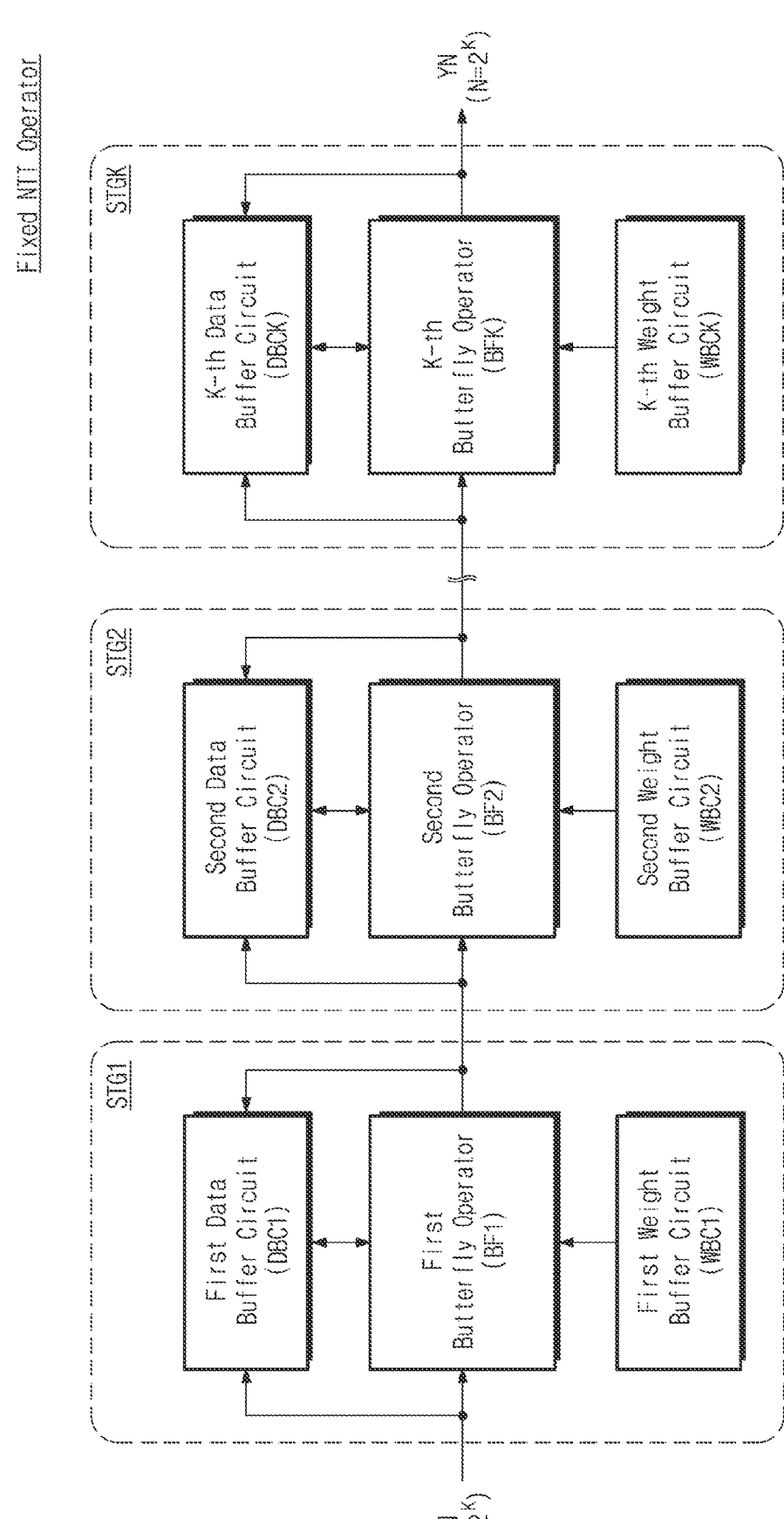
FIG. 5 is a diagram illustrating a fixed NTT operator.

FIG. 5 is a diagram illustrating a fixed NTT operator. Referring to FIG. 5, a fixed NTT operator may be configured to perform the NTT operation of the input data XN. The degree of the polynomial of the homomorphic ciphertext included in the input data XN may be "N". In an embodiment, "N" may be $2^K$. The fixed NTT operator may include the first to K-th stages STG1 to STGK connected in series. The first to K-th stages STG1 to STGK may perform the NTT operation of the input data XN.

The first to K-th stages STG1 to STGK may be connected in series. The first stage STG1 may generate first output data based on the butterfly operation of the input data XN. The first output data of the first stage STG1 may be input data of the second stage STG2. As in the above description, the second stage STG2 may generate second output data based on the butterfly operation of the first output data received from the first stage STG1. The K-th stage STGK may generate K-th output data based on the butterfly operation of the (K–1)-th output data received from the (K–1)-th STGK–1. The K-th output data may be the output data YN. That is, the K-th stage STGK may generate the output data YN being final output data of the NTT operation of the input data XN.

In detail, the first stage STG1 may include a first data buffer circuit DBC1, a first butterfly operator BF1, and a first weight buffer circuit WBC1. The first weight buffer circuit WBC1 may receive first weight data corresponding to the input data XN. The first data buffer circuit DBC1 may receive the input data XN. The first butterfly operator BF1 may receive the input data XN from the outside, may receive the first weight data from the first weight buffer circuit WBC1, and may generate a first butterfly operation signal by performing the butterfly operation of the input data XN and the first weight data based on the communication with the first data buffer circuit DBC1. The first butterfly operator BF1 may provide the first butterfly operation signal to the second stage STG2.

As in above description, the second stage STG2 may include a second data buffer circuit DBC2, a second butterfly operator BF2, and a second weight buffer circuit WBC2. The second butterfly operator BF2 may receive the first butterfly operation signal from the first stage STG1, may receive second weight data from the second weight buffer circuit WBC2, and may generate a second butterfly operation signal by performing the butterfly operation of the first butterfly operation signal and the second weight data based on the communication with the second data buffer circuit DBC2.

Likewise, the K-th stage STGK may include a K-th data buffer circuit DBCK, a K-th butterfly operator BFK, and a K-th weight buffer circuit WBCK. The K-th butterfly operator BFK may receive the (K–1)-th butterfly operation signal from the (K–1)-th STGK–1, may receive K-th weight data from the K-th weight buffer circuit WBCK, and may generate the output data YN by performing the butterfly operation of the (K−1)-th butterfly operation signal and the K-th weight data based on the communication with the K-th data buffer circuit DBCK.

As described above, the plurality of stages STG1 to STGK of the fixed NTT operator may perform the NTT operation of the homomorphic ciphertext with respect to the input data XN. There may be a correlation between the number (i.e., K) of stages included in the fixed NTT operator and the degree (i.e., N) of the polynomial of the homomorphic ciphertext of the input data XN. Accordingly, when the degree of the homomorphic ciphertext changes, the number of stages that the NTT operator requires may change. A relationship between the degree of the homomorphic ciphertext and the number of required stages will be described in detail with reference to FIG. 6.

FIG. 6 is a diagram illustrating an NTT table according to some embodiments of the present disclosure. Referring to FIG. 6, when an NTT operator including 16 stages processes input data including a homomorphic ciphertext whose degree is variable, the degree of data processed in each stage and a twiddle factor of weight data will be described.

Below, in the NTT operator described with reference to FIG. 6, "K" may indicate the number of stages in the NTT operator. The degree of the homomorphic ciphertext of input data may be "N". In an embodiment, "N" may be $2^M$. Herein, "M" may be an arbitrary integer that is more than or equal to "0" and is less than or equal to "K". That is, the degree of input data may vary depending on a change of "M", and the number of stages that the NTT operator requires may vary depending on the variable degree of the input data.

For example, referring to the case where "N" is $2^{16}$, all the 16 stages of the NTT operator may be required. The NTT operator may obtain output data of the NTT operation by sequentially performing the butterfly operations of all the stages.

As another example, referring to the case where "N" is $2^{15}$, 15 stages among the 16 stages of the NTT operator may be required. The NTT operator may obtain output data of the NTT operation by disabling the first stage and sequentially performing the butterfly operations of the second to sixteenth stages.

As another example, referring to the case where "N" is $2^1$, one stage among the 16 stages of the NTT operator may be required. The NTT operator may obtain output data of the NTT operation by disabling the first to fifteenth stages and performing the butterfly operation of the sixteenth stage.

As another example, referring to the case where "N" is $2^0$, all the 16 stages of the NTT operator may not be required. The NTT operator may obtain output data of the NTT operation by disabling all the stages (i.e., the first to sixteenth stages) and bypassing input data without modification.

As described above, when the degree of the homomorphic ciphertext of the input data changes, the number of stages that the NTT operator requires may change. An NTT operator that selectively enables stages may be required to efficiently process the homomorphic ciphertext whose degree is variable. The NTT operator that processes the homomorphic ciphertext whose degree is variable will be described in detail with reference to FIGS. 7 to 9.

Figure 7:
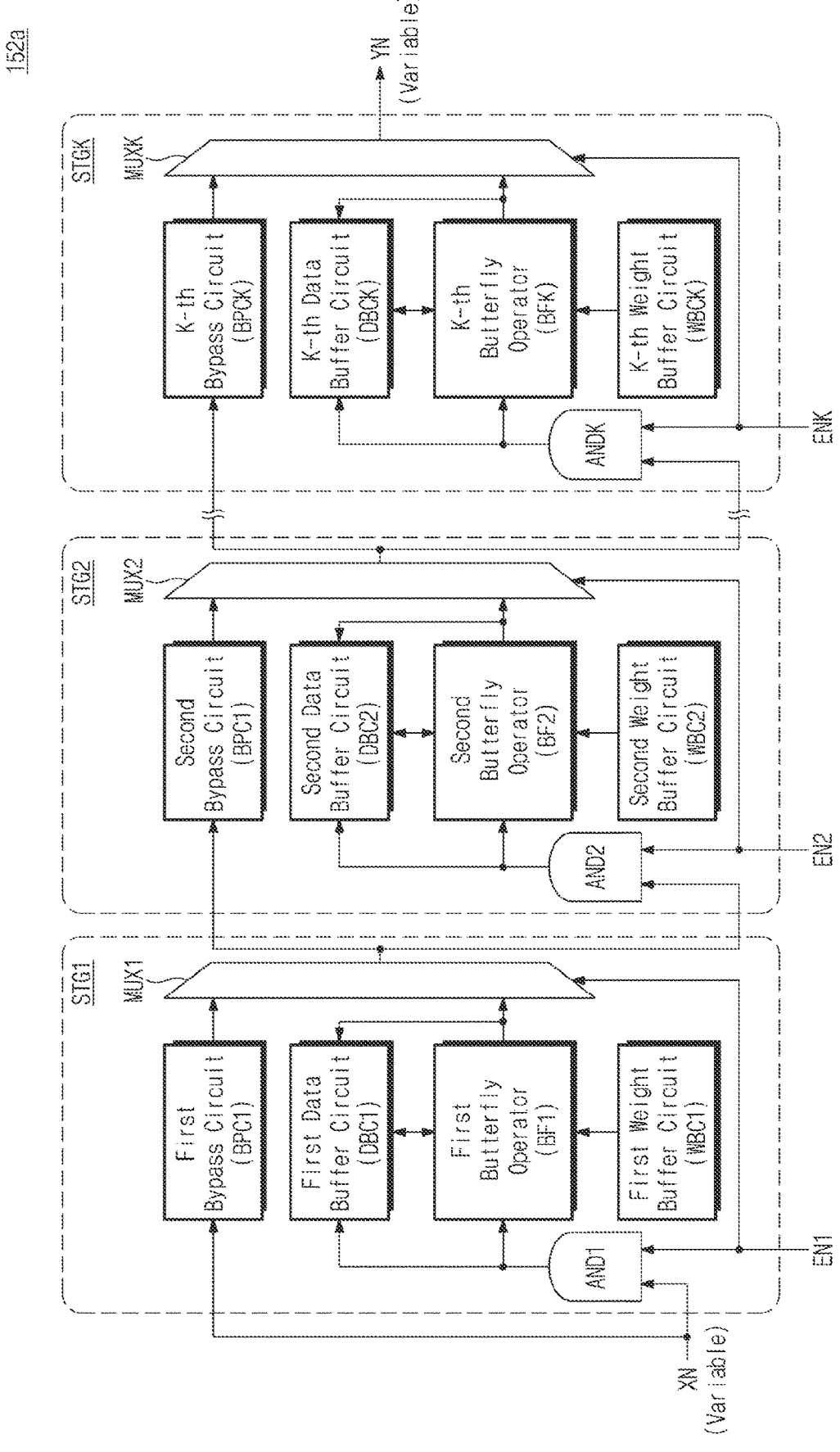
FIG. 7 is a diagram describing an NTT operator of FIG. 2, according to some embodiments of the present disclosure.

FIG. 7 is a diagram describing an NTT operator of FIG. 2, according to some embodiments of the present disclosure. Referring to FIGS. 2 and 7, the NTT operator 152a may receive the input data XN from the data I/O circuit 151. The NTT operator 152a may generate the output data YN based on the NTT operation of the input data XN. The NTT operator 152a may provide the output data YN to the data I/O circuit 151. In this case, the degree of the input data XN and the output data YN may be variable. The NTT operator 152a may efficiently perform the homomorphic encryption operation of the input data XN whose degree is variable.

The NTT operator 152a may be configured to perform the NTT operation of the input data XN and may include the first to K-th stages STG1 to STGK connected in series.

The first stage STG1 may receive the input data XN and may generate first output data by performing the butterfly operation of the input data XN based on a first enable signal EN1 or bypassing the input data XN based on the first enable signal EN1. The first output data of the first stage STG1 may be provided to the second stage STG2. The first stage STG1 may include a first logic circuit AND1, the first weight buffer circuit WBC1, the first data buffer circuit DBC1, the first butterfly operator BF1, a first bypass circuit BPC1, and a first multiplexer MUX1.

The first logic circuit AND1 may generate a first logic operation signal based on the AND operation of the first enable signal EN1 and the input data XN. The first enable signal EN1 may have a first logical value or a second logical value depending on the degree of the polynomial of the input data XN. The first logical value may correspond to a bit value of "1" or a logic high level. The second logical value may correspond to a bit value of "0" or a logic low level. The first logic circuit AND1 may provide the first logic operation signal to the first data buffer circuit DBC1 and the first butterfly operator BF1.

The first weight buffer circuit WBC1 may receive first weight data corresponding to the input data XN from the processor 153 or a separate memory device. The first weight buffer circuit WBC1 may provide the first weight data to the first butterfly operator BF1.

The first data buffer circuit DBC1 may receive the first logic operation signal from the first logic circuit AND1.

The first butterfly operator BF1 may receive the first logic operation signal from the first logic circuit AND1, may receive the first weight data from the first weight buffer circuit WBC1, and may generate a first butterfly operation signal by performing the butterfly operation of the first logic operation signal and the first weight data based on the communication with the first data buffer circuit DBC1. The first butterfly operator BF1 may provide the first butterfly operation signal to the first multiplexer MUX1.

The first bypass circuit BPC1 may receive the input data XN. The first bypass circuit BPC1 may bypass the input data XN so as to be provided to the first multiplexer MUX1.

The first multiplexer MUX1 may receive the first butterfly operation signal from the first butterfly operator BF1, may receive the input data XN from the first bypass circuit BPC1, may output the first butterfly operation signal to the second stage STG2 as first output data in response to that the first enable signal EN1 has the first logical value, and may output the input data XN to the second stage STG2 as the first output data in response to that the first enable signal EN1 has the second logical value.

As in the above description, the second stage STG2 may receive the first output data from the first stage STG1 and may generate second output data by performing the butterfly operation of the first output data based on a second enable signal EN2 or bypassing the first output data based on the second enable signal EN2. The second stage STG2 may provide the second output data to the third stage STG3. The second stage STG2 may include a second logic circuit AND2, the second weight buffer circuit WBC2, the second data buffer circuit DBC2, the second butterfly operator BF2, a second bypass circuit BPC2, and a second multiplexer MUX2.

The second logic circuit AND2 may generate a second logic operation signal based on an AND operation of the second enable signal EN2 and the first output data. The second enable signal EN2 may have the first logical value or the second logical value depending on the degree of the polynomial of the input data XN. The second logic circuit AND2 may provide the second logic operation signal to the second data buffer circuit DBC2 and the second butterfly operator BF2.

The second weight buffer circuit WBC2 may receive second weight data corresponding to the first output data from the processor 153 or the separate memory device. The second weight buffer circuit WBC2 may provide the second weight data to the second butterfly operator BF2.

The second data buffer circuit DBC2 may receive the second logic operation signal from the second logic circuit AND2.

The second butterfly operator BF2 may receive the second logic operation signal from the second logic circuit AND2, may receive the second weight data from the second weight buffer circuit WBC2, and may generate a second butterfly operation signal by performing the butterfly operation of the second logic operation signal and the second weight data based on the communication with the second data buffer circuit DBC2. The second butterfly operator BF2 may provide the second butterfly operation signal to the second multiplexer MUX2.

The second bypass circuit BPC2 may receive the first output data. The second bypass circuit BPC2 may bypass the first output data so as to be provided to the second multiplexer MUX2.

The second multiplexer MUX2 may receive the second butterfly operation signal from the second butterfly operator BF2, may receive the first output data from the second bypass circuit BPC2, may output the second butterfly operation signal to the third stage STG3 as second output data in response to that the second enable signal EN2 has the first logical value, and may output the first output data to the third stage STG3 as the second output data in response to that the second enable signal EN2 has the second logical value.

Likewise, the K-th stage STGK may receive the (K−1)-th output data from the (K−1)-th stage STGK−1 and may generate K-th output data by performing the butterfly operation of the (K−1)-th output data based on a K-th enable signal ENK or bypassing the (K−1)-th output data based on the K-th enable signal ENK. The K-th output data may be final output data of the NTT operation of the input data XN and may be referred to as "output data YN". The K-th stage STGK may provide the output data YN to the data I/O circuit 151. The K-th stage STGK may include a K-th logic circuit ANDK, the K-th weight buffer circuit WBCK, the K-th data buffer circuit DBCK, the K-th butterfly operator BFK, a K-th bypass circuit BPCK, and a K-th multiplexer MUXK.

The K-th logic circuit ANDK may generate a K-th logic operation signal based on the AND operation of the K-th enable signal ENK and the (K−1)-th output data. The K-th enable signal ENK may have the first logical value or the second logical value depending on the degree of the polynomial of the input data XN. The K-th logic circuit ANDK may provide the K-th logic operation signal to the K-th data buffer circuit DBCK and the K-th butterfly operator BFK.

The K-th weight buffer circuit WBCK may receive K-th weight data corresponding to the K-th data (i.e., the output data YN) from the processor 153 or the separate memory device. The K-th weight buffer circuit WBCK may provide the K-th weight data to the K-th butterfly operator BFK.

The K-th data buffer circuit DBCK may receive the K-th logic operation signal from the K-th logic circuit ANDK.

The K-th butterfly operator BFK may receive the K-th logic operation signal from the K-th logic circuit ANDK, may receive K-th weight data from the K-th weight buffer circuit WBCK, and may generate a K-th butterfly operation signal by performing the butterfly operation of the K-th logic operation signal and the K-th weight data based on the communication with the K-th data buffer circuit DBCK. The K-th butterfly operator BFK may provide the K-th butterfly operation signal to the K-th multiplexer MUXK.

The K-th bypass circuit BPCK may receive the (K−1)-th output data. The K-th bypass circuit BPCK may bypass the (K−1)-th output data so as to be provided to the K-th multiplexer MUXK.

The K-th multiplexer MUXK may receive the K-th butterfly operation signal from the K-th butterfly operator BFK, may receive the (K−1)-th output data from the K-th bypass circuit BPCK, may output the K-th butterfly operation signal as K-th output data (i.e., the output data YN) in response to that the K-th enable signal ENK has the first logical value, and may output the (K−1)-th output data as the K-th output data (i.e., the output data YN) in response to that the K-th enable signal ENK has the second logical value.

FIG. 8 is a table describing enable signals of FIG. 7, according to some embodiments of the present disclosure. An NTT enable table that describes an enable signal set for an example value of "K" in an NTT operator will be described with reference to FIGS. 7 and 8. The enable signal set may include all the enable signals that are used in the NTT operator 152a of FIG. 7.

The enable signal set may include the first to K-th enable signals EN1 to ENK. A logical value of each of the first to K-th enable signals EN1 to ENK may vary depending on the degree of the input data XN. The degree of the homomorphic ciphertext of the input data XN may be "N". In an embodiment, "N" may be $2^M$. Herein, "M" may be an arbitrary integer that is more than or equal to "0" and is less than or equal to "K".

Each of the logical values of the (K−M+1)-th to K-th enable signals ENK-M+1 to ENK among the first to K-th enable signals EN1 to ENK may be set to a first logical value (e.g., a bit value of "1"). In an embodiment, when "M" is "0", there may be no enable signal having the first logical value from among the first to K-th enable signals EN1 to ENK.

Each of the logical values of the first to (K−M)-th enable signals ENK1 to ENK-M among the first to K-th enable signals EN1 to ENK may be set to a second logical value (e.g., a bit value of "0"). In an embodiment, when "M" is "0", there may be no enable signal having the second logical value from among the first to K-th enable signals EN1 to ENK.

Below, for better understanding of the present disclosure, the example in which "K" is 16 will be described, but the present disclosure is not limited thereto.

In some embodiments, "K" may be 16. The enable signal set may include the first to sixteenth enable signals EN1 to EN16. The NTT operator 152a may include the first to sixteenth stages STG1 to STG16. The degree of the homomorphic ciphertext of the input data XN provided to the NTT operator 152a may be "N". In an embodiment, "N" may be $2^M$. Herein, "M" may be an arbitrary integer that is more than or equal to "0" and is less than or equal to "16". That is, the degree of the input data XN may vary depending on a change of "M", and the number of stages that the NTT operator 152*a* requires may vary depending on the input data XN whose degree is variable.

For example, referring to the case where "N" is $2^{16}$, "M" may be 16. The logical value of each of the first to sixteenth enable signals EN1 to EN16 may be set to a bit value of "1". In this case, there may be no enable signal having a bit value of "0" from among the first to sixteenth enable signals EN1 to EN16.

As another example, referring to the case where "N" is $2^{15}$, "M" may be 15. The logical value of each of the second to sixteenth enable signals EN2 to EN16 among the first to sixteenth enable signals EN1 to EN16 may be set to a bit value of "1", and the logical value of the first enable signal EN1 may be set to a bit value of "0".

As another example, referring to the case where "N" is $2^1$, "M" may be 1. The logical value of the sixteenth enable signal EN16 among the first to sixteenth enable signals EN1 to EN16 may be set to a bit value of "1", and the logical value of each of the first to fifteenth enable signals EN1 to EN15 may be set to a bit value of "0".

As another example, referring to the case where "N" is $2^0$, "M" may be 0. The logical value of each of the first to sixteenth enable signals EN1 to EN16 may be set to a bit value of "0". In this case, there may be no enable signal having a bit value of "1" from among the first to sixteenth enable signals EN1 to EN16.

Figure 9:
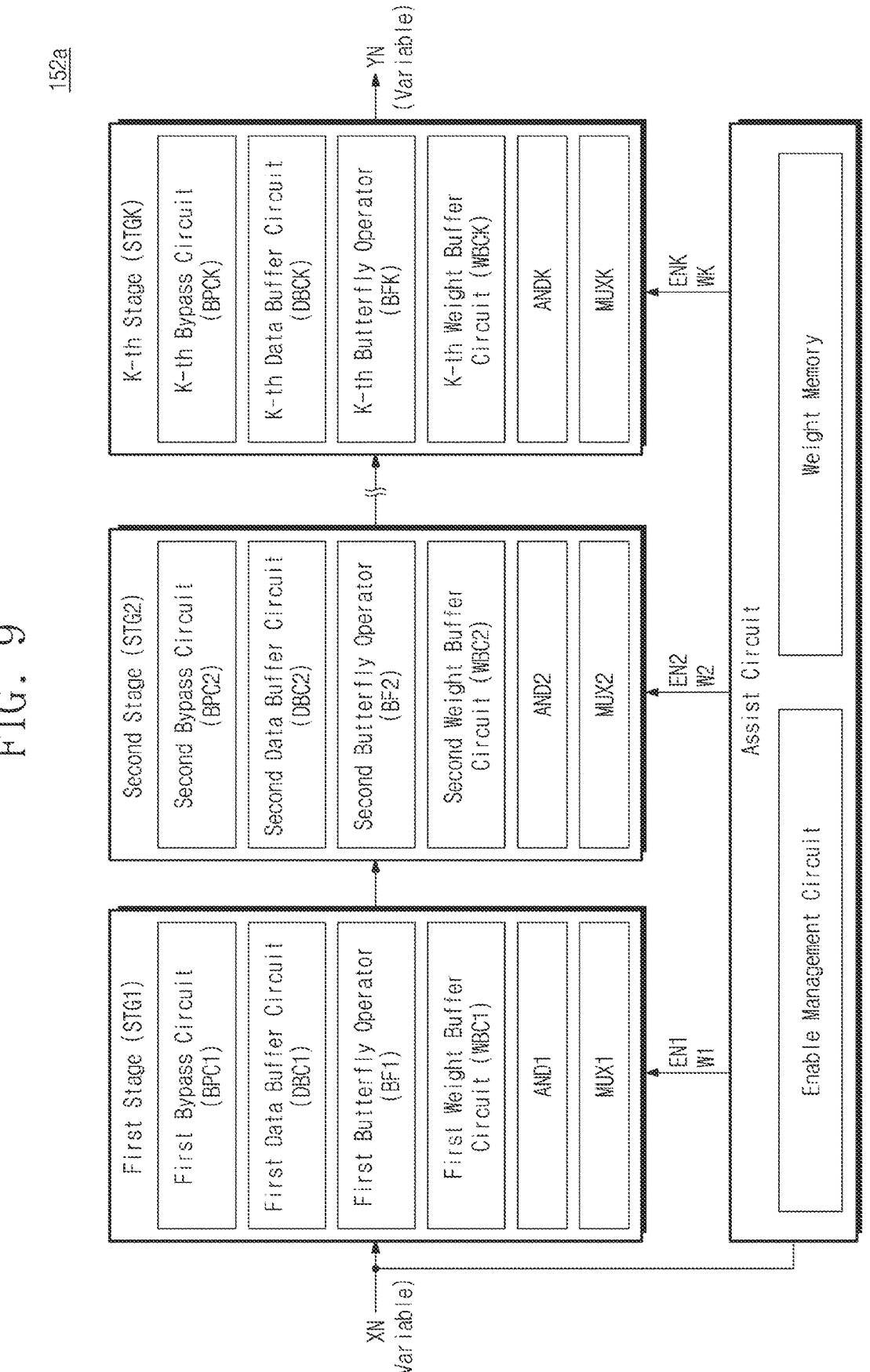
FIG. 9 is a diagram describing an NTT operator according to some embodiments of the present disclosure.

FIG. 9 is a diagram describing an NTT operator according to some embodiments of the present disclosure. Referring to FIG. 9, the NTT operator 152*a* may include the first to K-th stages STG1 to STGK and an assist circuit. The first to K-th stages STG1 to STGK may generate the output data YN by performing the NTT operation of the input data XN including the polynomial of the homomorphic ciphertext. The degree of the polynomial of the input data XN may be "N". Herein, "N" may be a natural number less than or equal to $2^K$. The first to K-th stages STG1 to STGK may be connected in series.

The assist circuit may include an enable management circuit and a weight memory. The enable management circuit may generate the first to K-th enable signals EN1 to ENK based on the degree of the polynomial of the input data XN. The enable management circuit may provide the first to K-th enable signals EN1 to ENK to the first to K-th stages STG1 to STGK, respectively.

The weight memory may store a plurality of weight data. For example, the weight memory may store the plurality of weight data that are received from the processor 153 of FIG. 2 or from the external device through the data I/O circuit 151. The weight memory may provide first to K-th weight data W1 to WK to the first to K-th stages STG1 to STGK, respectively.

The first to K-th weight data W1 to WK may be weight data determined to be appropriate for the first to K-th stages STG1 to STGK based on the degree of the polynomial of the input data XN. For example, referring to FIGS. 6 and 9, the weight data appropriate for the first stage STG1 may be the twiddle factor of "1". The weight data appropriate for the second stage STG1 may be the twiddle factor of "1" or "2". As another example, the weight memory may not provide the weight data to a disabled stage (i.e., a stage receiving the enable signal having the second logical value).

Each of the first to K-th stages STG1 to STGK may perform the butterfly operation of the input data XN or corresponding output data of a previous stage in response to that the corresponding enable signal among the first to K-th enable signals EN1 to ENK indicates the first logical value.

Each of the first to K-th stages STG1 to STGK may bypass the input data XN or output data of a previous stage in response to that the corresponding enable signal among the first to K-th enable signals EN1 to ENK indicates the second logical value.

The first stage STG1 may receive the input data XN from the data I/O circuit 151 of FIG. 2. The first stage STG1 may receive the first enable signal EN1 and the first weight data W1 from the assist circuit. The first stage STG1 may include the first bypass circuit BPC1, the first data buffer circuit DBC1, the first butterfly operator BF1, the first weight buffer circuit WBC1, the first logic circuit AND1, and the first multiplexer MUX1.

In response to that the first enable signal EN1 indicates the first logical value, the first stage STG1 may generate first output data by performing the butterfly operation of the input data XN and the first weight data W1 through the first butterfly operator BF1. In response to that the first enable signal EN1 indicates the second logical value, the first stage STG1 may generate the first output data by bypassing the input data XN through the first bypass circuit BPC1. The first output data of the first stage STG1 may be provided to the second stage STG2.

As in the above description, the second stage STG2 may receive the first output data from the first stage STG1. The second stage STG2 may receive the second enable signal EN2 and the second weight data W2 from the assist circuit. In response to that the second enable signal EN2 indicates the first logical value, the second stage STG2 may generate second output data by performing the butterfly operation of the first output data and the second weight data W2 through the second butterfly operator BF2. In response to that the second enable signal EN2 indicates the second logical value, the second stage STG2 may generate second output data by bypassing the first output data through the second bypass circuit BPC2. The second stage STG2 may provide the second output data to the third stage STG3.

Likewise, the K-th stage STGK may receive the (K–1)-th output data from the (K–1)-th stage STGK–1. The K-th stage STGK may receive the K-th enable signal ENK and the K-th weight data WK from the assist circuit. In response to that the K-th enable signal ENK indicates the first logical value, the K-th stage STGK may generate the output data YN by performing the butterfly operation of the (K–1)-th output data and the K-th weight data WK through the K-th butterfly operator BFK. In response to that the K-th enable signal ENK indicates the second logical value, the K-th stage STGK may generate the output data YN by bypassing the (K–1)-th output data through K-th bypass circuit BPCK. The output data YN may be final output data of the NTT operation of the input data XN. The K-th stage STGK may provide the output data YN to the data I/O circuit 151 of FIG. 2.

Figure 10:
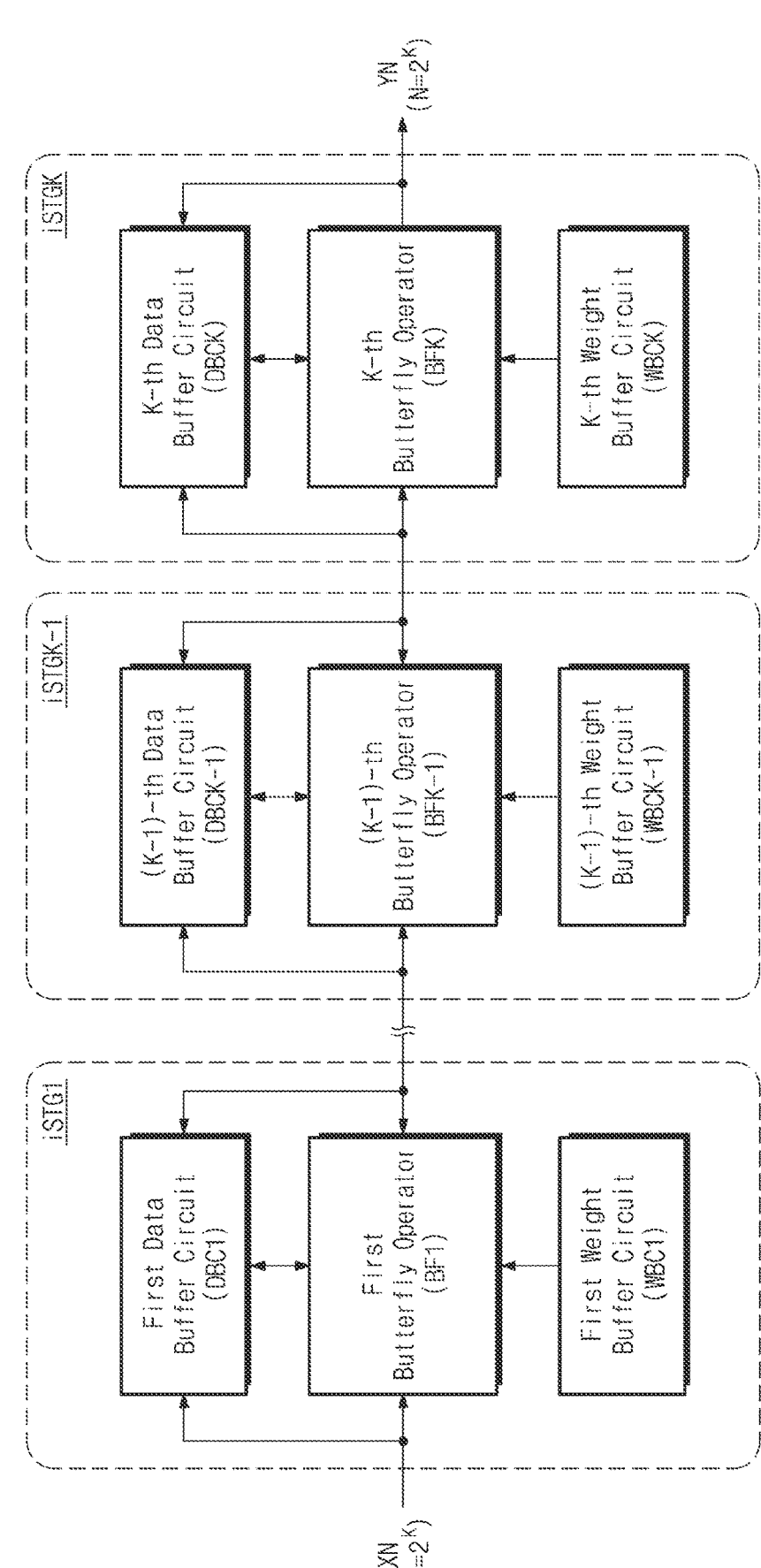
FIG. 10 is a diagram illustrating a fixed INTT (Inverse Number Theoretic Transform) operator.

FIG. 10 is a diagram illustrating a fixed INTT operator. Referring to FIG. 10, a fixed INTT operator may be configured to perform the INTT operation of the input data XN. The INTT operation may be an operation corresponding to the NTT operation. The degree of the polynomial of the homomorphic ciphertext included in the input data XN may be "N". In an embodiment, "N" may be $2^K$. The fixed INTT operator may include the first to K-th stages iSTG1 to iSTGK connected in series. The first to K-th stages iSTG1 to iSTGK may perform the INTT operation of the input data XN.

The first to K-th stages iSTG1 to iSTGK may be connected in series. The first stage iSTG1 may generate first output data based on the butterfly operation of the input data XN. The first output data of the first stage iSTG1 may be input data of the second stage iSTG2. As in the above description, the (K−1)-th stage iSTGK−1 may generate (K−1)-th output data based on the butterfly operation of the (K−2)-th output data received from the (K−2)-th stage iSTGK−2. The K-th stage iSTGK may generate K-th output data based on the butterfly operation of the (K−1)-th output data received from the (K−1)-th stage iSTGK−1. The K-th output data may be the output data YN. That is, the K-th stage iSTGK may generate the output data YN being final output data of the INTT operation of the input data XN.

In detail, the first stage iSTG1 may include a first data buffer circuit DBC1, a first butterfly operator BF1, and a first weight buffer circuit WBC1. The first weight buffer circuit WBC1 may receive first weight data corresponding to the input data XN. The first data buffer circuit DBC1 may receive the input data XN. The first butterfly operator BF1 may receive the input data XN from the outside, may receive the first weight data from the first weight buffer circuit WBC1, and may generate a first butterfly operation signal by performing the butterfly operation of the input data XN and the first weight data based on the communication with the first data buffer circuit DBC1. The first butterfly operator BF1 may provide the first butterfly operation signal to the second stage iSTG2.

As in above description, the (K−1)-th stage iSTGK−1 may include a (K−1)-th data buffer circuit DBCK−1, a (K−1)-th butterfly operator BFK−1, and a (K−1)-th weight buffer circuit WBCK−1. The (K−1)-th butterfly operator BFK−1 may receive the (K−2)-th butterfly operation signal from the (K−2)-th stage iSTGK−2, may receive the (K−1)-th weight data from the (K−1)-th weight buffer circuit WBCK−1, and may generate the (K−1)-th butterfly operation signal by performing the butterfly operation of the (K−2)-th butterfly operation signal and the (K−1)-th weight data based on the communication with the (K−1)-th data buffer circuit DBCK−1.

Likewise, the K-th stage iSTGK may include a K-th data buffer circuit DBCK, a K-th butterfly operator BFK, and a K-th weight buffer circuit WBCK. The K-th butterfly operator BFK may receive the (K−1)-th butterfly operation signal from the (K−1)-th iSTGK−1, may receive K-th weight data from the K-th weight buffer circuit WBCK, and may generate the output data YN by performing the butterfly operation of the (K−1)-th butterfly operation signal and the K-th weight data based on the communication with the K-th data buffer circuit DBCK.

As described above, the plurality of stages STG1 to STGK of the fixed INTT operator may perform the INTT operation of the homomorphic ciphertext with respect to the input data XN. There may be a correlation between the number (i.e., K) of stages included in the fixed INTT operator and the degree (i.e., N) of the polynomial of the homomorphic ciphertext of the input data XN. Accordingly, when the degree of the homomorphic ciphertext changes, the number of stages that the INTT operator requires may change. A relationship between the degree of the homomorphic ciphertext and the number of required stages will be described in detail with reference to FIG. 11.

FIG. 11 is a diagram illustrating an INTT table according to some embodiments of the present disclosure. Referring to FIG. 11, when an INTT operator including 16 stages processes input data including a homomorphic ciphertext whose degree is variable, the degree of data processed in each stage and a twiddle factor of weight data will be described.

Below, in the INTT operator described with reference to FIG. 11, "K" may indicate the number of stages in the INTT operator. The degree of the homomorphic ciphertext of input data may be "N". In an embodiment, "N" may be $2^M$. Herein, "M" may be an arbitrary integer that is more than or equal to "0" and is less than or equal to "K". That is, the degree of input data may vary depending on a change of "M", and the number of stages that the INTT operator requires may vary depending on the variable degree of the input data.

For example, referring to the case where "N" is $2^{16}$, all the 16 stages of the INTT operator may be required. The INTT operator may obtain output data of the INTT operation by sequentially performing the butterfly operations of all the stages.

As another example, referring to the case where "N" is $2^{15}$, 15 stages among the 16 stages of the INTT operator may be required. The INTT operator may obtain output data of the INTT operation by sequentially performing the butterfly operations of the first to fifteenth stages and disabling the sixteenth stage.

As another example, referring to the case where "N" is $2^1$, one stage among the 16 stages of the INTT operator may be required. The INTT operator may obtain output data of the INTT operation by performing the butterfly operation of the first stage and disabling the second to sixteenth stages.

As another example, referring to the case where "N" is $2^0$, all the 16 stages of the INTT operator may not be required. The INTT operator may obtain output data of the INTT operation by disabling all the stages (i.e., the first to sixteenth stages) and bypassing input data without modification.

In some embodiments, the operations of the first to K-th stages of the INTT operator may correspond to the operations of the first to K-th stages of the NTT operator in an inverse order. For example, the operation of the first stage of the NTT operator may correspond to the operation of the K-th stage of the INTT operator. The operation of the second stage of the NTT operator may correspond to the operation of the (K−1)-th stage of the INTT operator. The operation of the K-th stage of the NTT operator may correspond to the operation of the first stage of the INTT operator.

As described above, when the degree of the homomorphic ciphertext of the input data changes, the number of stages that the INTT operator requires may change. An INTT operator that selectively enables stages may be required to efficiently process the homomorphic ciphertext whose degree is variable. The INTT operator that processes the homomorphic ciphertext whose degree is variable will be described in detail with reference to FIGS. 12 to 14.

Figure 12:
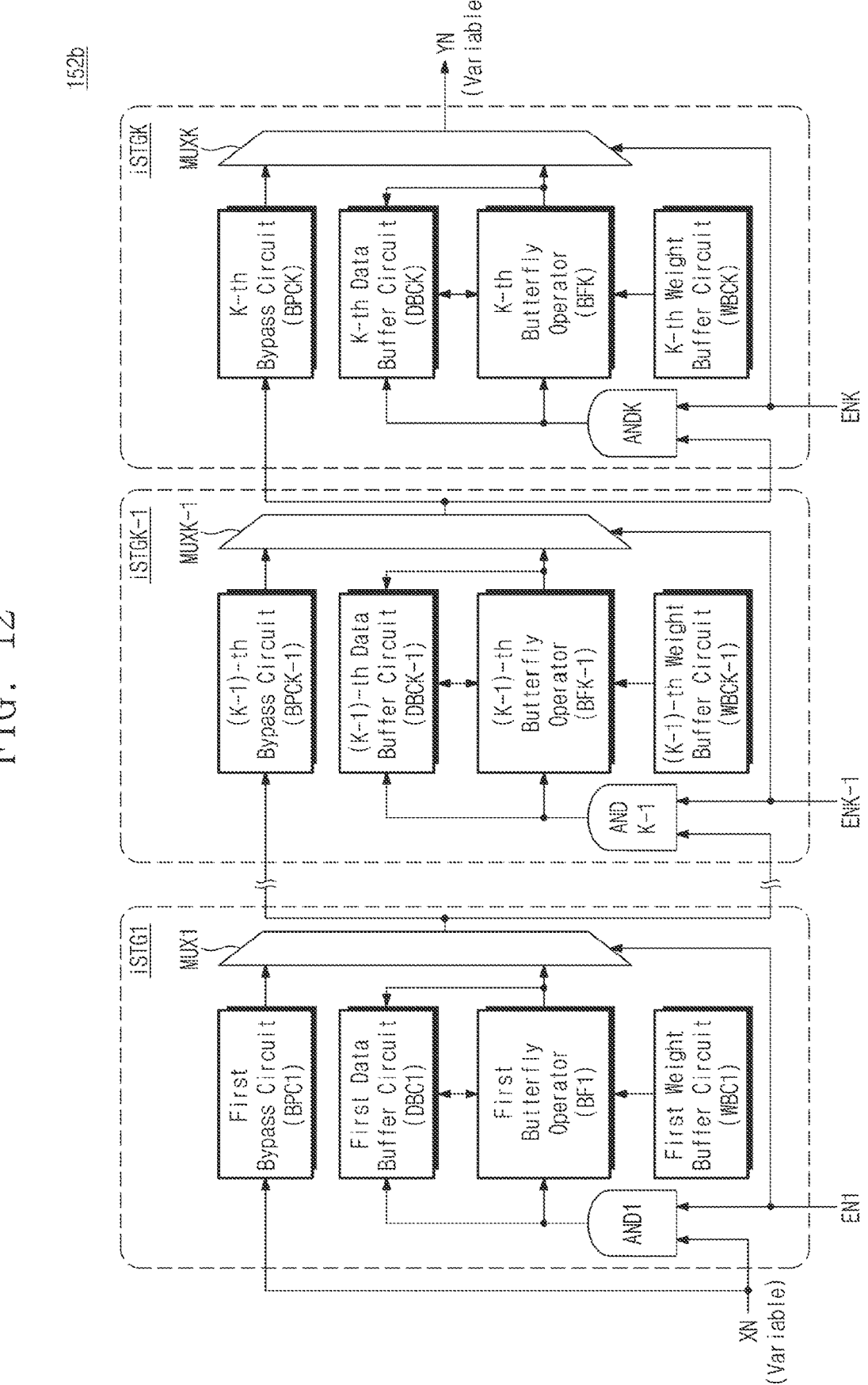
FIG. 12 is a diagram describing an INTT operator of FIG. 2, according to some embodiments of the present disclosure.

FIG. 12 is a diagram describing an INTT operator of FIG. 2, according to some embodiments of the present disclosure. Referring to FIGS. 2 and 12, the INTT operator 152b may receive the input data XN from the data I/O circuit 151. The INTT operator 152b may generate the output data YN based on the INTT operation of the input data XN. The INTT operator 152b may provide the output data YN to the data I/O circuit 151. In this case, the degree of the input data XN and the output data YN may be variable. The INTT operator 152b may efficiently perform the homomorphic encryption operation of the input data XN whose degree is variable.

The INTT operator 152b may be configured to perform the INTT operation of the input data XN and may include the first to K-th stages iSTG1 to iSTGK connected in series.

The first stage iSTG1 may receive the input data XN and may generate first output data by performing the butterfly operation of the input data XN based on the first enable signal EN1 or bypassing the input data XN based on the first enable signal EN1. The first output data of the first stage iSTG1 may be provided to the second stage iSTG2. The first stage iSTG1 may include the first logic circuit AND1, the first weight buffer circuit WBC1, the first data buffer circuit DBC1, the first butterfly operator BF1, the first bypass circuit BPC1, and the first multiplexer MUX1.

Excepting that an input direction is opposite to an output direction, an operation of the first stage iSTG1 of the INTT operator 152*b* may be similar to the operation of the K-th stage STGK of the NTT operator 152*a* of FIG. 7, and thus, additional description associated with the components of the first stage iSTG1 will be omitted to avoid redundancy.

As in the above description, the (K−1)-th stage iSTGK−1 may receive the (K−1)-th output data from the (K−2)-th stage iSTGK−2 and may generate (K−1)-th output data by performing the butterfly operation of the (K−2)-th output data based on the (K−1)-th enable signal ENK−1 or bypassing the (K−2)-th output data based on the (K−1)-th enable signal ENK−1. The (K−1)-th stage iSTGK−1 may provide the (K−1)-th output data to the K-th stage iSTGK. The (K−1)-th stage iSTGK−1 may include the (K−1)-th logic circuit ANDK−1, the (K−1)-th weight buffer circuit WBCK−1, the (K−1)-th data buffer circuit DBCK−1, the (K−1)-th butterfly operator BFK−1, the (K−1)-th bypass circuit BPCK−1, and the (K−1)-th multiplexer MUXK−1.

An operation of the (K−1)-th stage iSTGK−1 of the INTT operator 152*b* may be similar to the operation of the second stage STG2 of the NTT operator 152*a* of FIG. 7, and thus, additional description associated with the components of the (K−1)-th stage iSTGK−1 will be omitted to avoid redundancy.

Likewise, the K-th stage iSTGK may receive the (K−1)-th output data from the (K−1)-th stage iSTGK−1 and may generate K-th output data by performing the butterfly operation of the (K−1)-th output data based on the K-th enable signal ENK or bypassing the (K−1)-th output data based on the K-th enable signal ENK. The K-th output data may be final output data of the INTT operation of the input data XN and may be referred to as "output data YN". The K-th stage iSTGK may provide the output data YN to the data I/O circuit 151. The K-th stage iSTGK may include the K-th logic circuit ANDK, the K-th weight buffer circuit WBCK, the K-th data buffer circuit DBCK, the K-th butterfly operator BFK, the K-th bypass circuit BPCK, and the K-th multiplexer MUXK.

An operation of the K-th stage iSTGK of the INTT operator 152*b* may be similar to the operation of the first stage STG1 of the NTT operator 152*a* of FIG. 7, and thus, additional description associated with the components of the K-th stage iSTGK will be omitted to avoid redundancy.

FIG. 13 is a table describing enable signals of FIG. 12, according to some embodiments of the present disclosure. An INTT enable table that describes an enable signal set for an example value of "K" in an INTT operator will be described with reference to FIGS. 12 and 13. The enable signal set may include all the enable signals that are used in the INTT operator 152*b* of FIG. 12.

The enable signal set may include the first to K-th enable signals EN1 to ENK. A logical value of each of the first to K-th enable signals EN1 to ENK may vary depending on the degree of the input data XN. The degree of the homomorphic ciphertext of the input data XN may be "N". In an embodiment, "N" may be $2^M$. Herein, "M" may be an arbitrary integer that is more than or equal to "0" and is less than or equal to "K".

Each of the logical values of the first to M-th enable signals ENK1 to ENM among the first to K-th enable signals EN1 to ENK may be set to a first logical value (e.g., a bit value of "1"). In an embodiment, when "M" is "0", there may be no enable signal having the first logical value from among the first to K-th enable signals EN1 to ENK.

Each of the logical values of the (M+1)-th to K-th enable signals ENM+1 to ENK among the first to K-th enable signals EN1 to ENK may be set to a second logical value (e.g., a bit value of "0"). In an embodiment, when "M" is "0", there may be no enable signal having the second logical value from among the first to K-th enable signals EN1 to ENK.

Below, for better understanding of the present disclosure, the example in which "K" is 16 will be described, but the present disclosure is not limited thereto.

In some embodiments, "K" may be 16. The enable signal set may include the first to sixteenth enable signals EN1 to EN16. The INTT operator 152*b* may include the first to sixteenth stages iSTG1 to iSTG16. The degree of the homomorphic ciphertext of the input data XN provided to the INTT operator 152*b* may be "N". In an embodiment, "N" may be $2^M$. Herein, "M" may be an arbitrary integer that is more than or equal to "0" and is less than or equal to "16". That is, the degree of the input data XN may vary depending on a change of "M", and the number of stages that the INTT operator 152*b* requires may vary depending on the input data XN whose degree is variable.

For example, referring to the case where "N" is $2^{16}$, "M" may be 16. The logical value of each of the first to sixteenth enable signals EN1 to EN16 may be set to a bit value of "1". In this case, there may be no enable signal having a bit value of "0" from among the first to sixteenth enable signals EN1 to EN16.

As another example, referring to the case where "N" is $2^{15}$, "M" may be 15. The logical value of each of the first to fifteenth enable signals EN1 to EN15 among the first to sixteenth enable signals EN1 to EN16 may be set to a bit value of "1", and the logical value of the sixteenth enable signal EN16 may be set to a bit value of "0".

As another example, referring to the case where "N" is $2^1$, "M" may be 1. The logical value of the first enable signal EN1 among the first to sixteenth enable signals EN1 to EN16 may be set to a bit value of "1", and the logical value of each of the second to sixteenth enable signals EN2 to EN16 may be set to a bit value of "0".

As another example, referring to the case where "N" is $2^0$, "M" may be 0. The logical value of each of the first to sixteenth enable signals EN1 to EN16 may be set to a bit value of "0". In this case, there may be no enable signal having a bit value of "1" from among the first to sixteenth enable signals EN1 to EN16.

Figure 14:
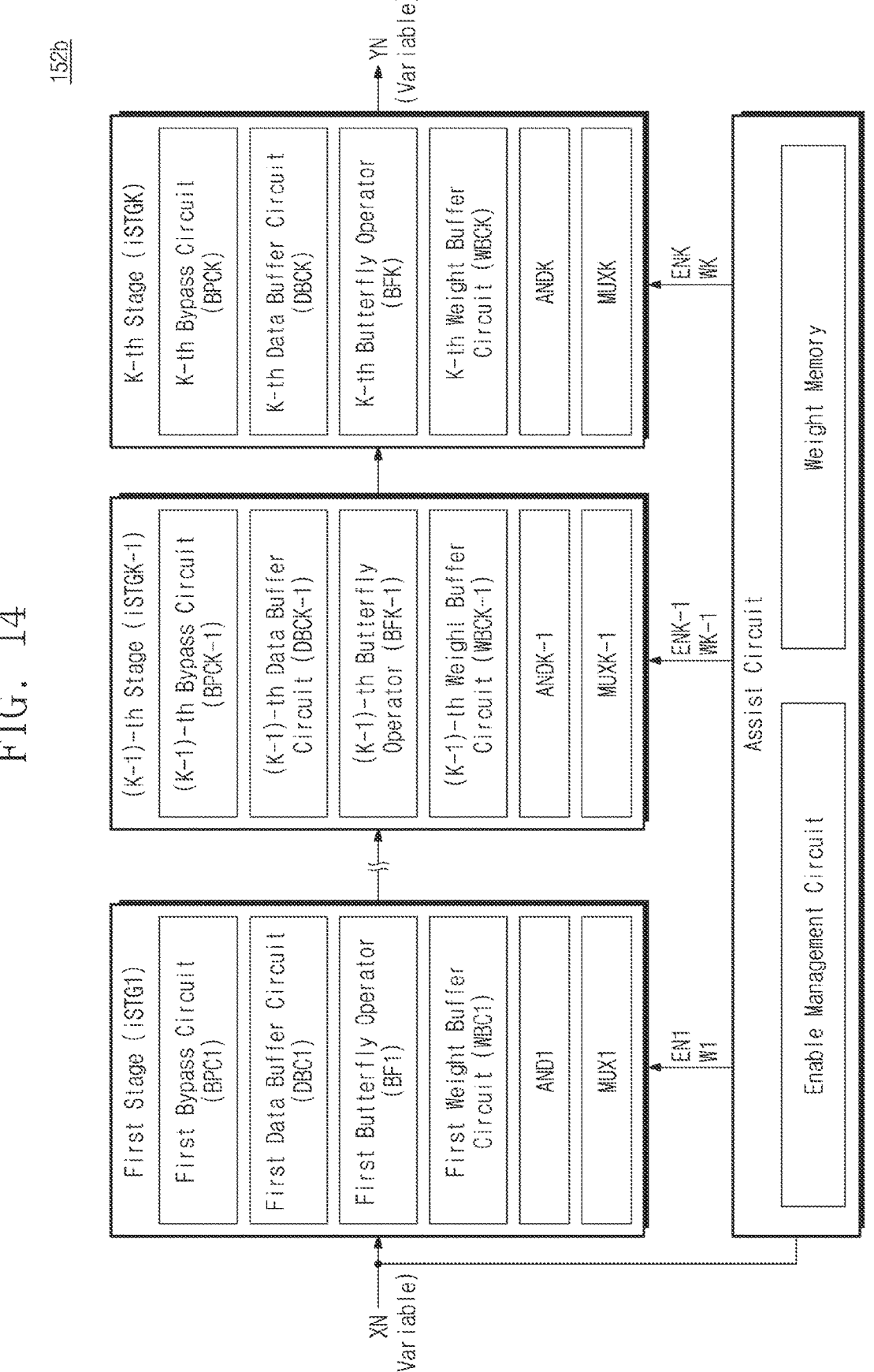
FIG. 14 is a diagram describing an INTT operator according to some embodiments of the present disclosure.

FIG. 14 is a diagram describing an INTT operator according to some embodiments of the present disclosure. Referring to FIG. 14, the INTT operator 152*b* may include the first to K-th stages iSTG1 to iSTGK and an assist circuit. The first to K-th stages iSTG1 to iSTGK may generate the output data YN by performing the INTT operation of the input data XN including the polynomial of the homomorphic ciphertext. The degree of the polynomial of the input data XN may be "N". Herein, "N" may be a natural number less than or equal to $2^K$. The first to K-th stages iSTG1 to iSTGK may be connected in series.

The assist circuit may include an enable management circuit and a weight memory. The enable management circuit may generate the first to K-th enable signals EN1 to ENK based on the degree of the polynomial of the input data XN. The enable management circuit may provide the first to K-th enable signals EN1 to ENK to the first to K-th stages iSTG1 to iSTGK, respectively.

The weight memory may store a plurality of weight data. For example, the weight memory may store the plurality of weight data that are received from the processor 153 of FIG. 2 or from the external device through the data I/O circuit 151. The weight memory may provide first to K-th weight data W1 to WK to the first to K-th stages iSTG1 to iSTGK, respectively.

The first to K-th weight data W1 to WK may be weight data determined to be appropriate for the first to K-th stages iSTG1 to iSTGK based on the degree of the polynomial of the input data XN. For example, referring to FIGS. 11 and 14, the weight data appropriate for the sixteenth stage iSTG16 may be the twiddle factor of "1". The weight data appropriate for the fifteenth stage STG15 may be the twiddle factor of "1" or "2". As another example, the weight memory may not provide the weight data to a disabled stage (i.e., a stage receiving the enable signal having the second logical value).

Each of the first to K-th stages iSTG1 to iSTGK may perform the butterfly operation of the input data XN or corresponding output data of a previous stage in response to that the corresponding enable signal among the first to K-th enable signals EN1 to ENK indicates the first logical value.

Each of the first to K-th stages iSTG1 to iSTGK may bypass the input data XN or output data of a previous stage in response to that the corresponding enable signal among the first to K-th enable signals EN1 to ENK indicates the second logical value.

The first stage iSTG1 may receive the input data XN from the data I/O circuit 151 of FIG. 2. The first stage iSTG1 may receive the first enable signal EN1 and the first weight data W1 from the assist circuit. The first stage iSTG1 may include the first bypass circuit BPC1, the first data buffer circuit DBC1, the first butterfly operator BF1, the first weight buffer circuit WBC1, the first logic circuit AND1, and the first multiplexer MUX1.

In response to that the first enable signal EN1 indicates the first logical value, the first stage iSTG1 may generate first output data by performing the butterfly operation of the input data XN and the first weight data W1 through the first butterfly operator BF1. In response to that the first enable signal EN1 indicates the second logical value, the first stage iSTG1 may generate the first output data by bypassing the input data XN through the first bypass circuit BPC1. The first output data of the first stage iSTG1 may be provided to the second stage iSTG2. The first stage iSTG1 of the INTT operator 152b may correspond to the K-th stage STGK of the NTT operator 152a of FIG. 9.

As in the above description, the (K−1)-th stage iSTGK−1 may receive the (K−2)-th output data received from the (K−2)-th stage iSTGK−2. The (K−1)-th stage iSTGK−1 may receive the (K−1)-th enable signal ENK−1 and the (K−1)-th weight data WK−1 from the assist circuit. In response to that the (K−1)-th enable signal ENK−1 indicates the first logical value, the (K−1)-th stage iSTGK−1 may generate (K−1)-th output data by performing the butterfly operation of the (K−2)-th output data and the (K−1)-th weight data WK−1 through the (K−1)-th butterfly operator BFK−1. In response to that the (K−1)-th enable signal ENK−1 indicates the second logical value, the (K−1)-th stage iSTGK−1 may generate the (K−1)-th output data by bypassing the (K−1)-th output data through the (K−1)-th bypass circuit BPCK−1. The (K−1)-th stage iSTGK−1 may provide the (K−1)-th output data to the K-th stage iSTGK. The (K−1)-th stage iSTGK−1 of the INTT operator 152b may correspond to the second stage STG2 of the NTT operator 152a of FIG. 9.

Likewise, the K-th stage iSTGK may receive the (K−1)-th output data from the (K−1)-th stage iSTGK−1. The K-th stage iSTGK may receive the K-th enable signal ENK and the K-th weight data WK from the assist circuit. In response to that the K-th enable signal ENK indicates the first logical value, the K-th stage iSTGK may generate the output data YN by performing the butterfly operation of the (K−1)-th data and the K-th weight data WK through the K-th butterfly operator BFK. In response to that the K-th enable signal ENK indicates the second logical value, the K-th stage iSTGK may generate the output data YN by bypassing the (K−1)-th output data through K-th bypass circuit BPCK. The output data YN may be final output data of the INTT operation of the input data XN. The K-th stage iSTGK may provide the output data YN to the data I/O circuit 151 of FIG. 2. The K-th stage iSTGK of the INTT operator 152b may correspond to the first stage STG1 of the NTT operator 152a of FIG. 9.

FIG. 15 is a diagram describing a homomorphic encryption computing device according to some embodiments of the present disclosure. Referring to FIG. 15, a homomorphic encryption computing device 250 may include a data I/O circuit 251, a computational accelerator 252, and a processor 253. The data I/O circuit 251 and the processor 253 are similar to the data I/O circuit 151 and the processor 153 of FIG. 2, and thus, additional description will be omitted to avoid redundancy.

The computational accelerator 252 may include an NTT modular multiplier 252a and an INTT modular multiplier 252b.

The NTT modular multiplier 252a may perform an NTT modular multiplication operation of the input data XN. The NTT modular multiplier 252a may include first to fourth parallel processing elements PE1 to PE4 and a combination element CE. The first to fourth parallel processing elements PE1 to PE4 may respectively generate first to fourth parallel signals. The combination element CE may generate a combination signal based on a result of combining the first to fourth parallel signals. The combination signal may be a result of the NTT modular multiplication operation or may be used in the NTT modular multiplication operation.

Each of the first to fourth parallel processing elements PE1 to PE4 may include a plurality of stages and an assist circuit. The assist circuit may generate a plurality of enable signals to be provided to the plurality of stages. For example, the first parallel processing element PE1 may include a plurality of stages STG11 to STG1K and an assist circuit. The second parallel processing element PE2 may include a plurality of stages STG21 to STG2K and an assist circuit. The third parallel processing element PE3 may include a plurality of stages STG31 to STG3K and an assist circuit. The fourth parallel processing element PE4 may include a plurality of stages STG41 to STG4K and an assist circuit. In some embodiments, the assist circuits of the first to fourth parallel processing elements PE1 to PE4 may be integrally implemented with one assist circuit.

For convenience of description, 4 parallel processing elements are illustrated, but the present disclosure is not limited thereto. The number of parallel processing units in the NTT modular multiplier 252a may increase or decrease.

The INTT modular multiplier 252b may perform an INTT modular multiplication operation of the input data XN. The INTT modular multiplier 252b may include first to fourth inverse-parallel processing elements iPE1 to iPE4 and an inverse-combination element iCE. The first to fourth inverse-parallel processing elements iPE1 to iPE4 may respectively generate first to fourth inverse-parallel signals.

The inverse-combination element iCE may generate an inverse-combination signal based on a result of combining the first to fourth inverse-parallel signals. The inverse-combination signal may be a result of the INTT modular multiplication operation or may be used in the INTT modular multiplication operation.

Each of the first to fourth inverse-parallel processing elements iPE1 to iPE4 may include a plurality of stages and an assist circuit. The assist circuit may generate a plurality of enable signals to be provided to the plurality of stages. For example, the first inverse-parallel processing element iPE1 may include a plurality of stages iSTG11 to iSTG1K and an assist circuit. The second inverse-parallel processing element iPE2 may include a plurality of stages iSTG21 to iSTG2K and an assist circuit. The third inverse-parallel processing element iPE3 may include a plurality of stages iSTG31 to iSTG3K and an assist circuit. The fourth inverse-parallel processing element iPE4 may include a plurality of stages iSTG41 to iSTG4K and an assist circuit. In some embodiments, the assist circuits of the first to fourth inverse-parallel processing elements iPE1 to iPE4 may be integrally implemented with one assist circuit.

For convenience of description, 4 inverse-parallel processing elements are illustrated, but the present disclosure is not limited thereto. The number of inverse-parallel processing units in the INTT modular multiplier 252b may increase or decrease.

According to an embodiment of the present disclosure, an accelerator generating an enable signal is provided.

Also, an accelerator that efficiently processes a homomorphic ciphertext whose degree is variable by selectively enabling a plurality of stages for processing the homomorphic ciphertext depending on the degree of the homomorphic ciphertext is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An apparatus comprising:
a homomorphic encryption computing device comprising:
an accelerator configured to receive first input encryption data including homomorphic ciphertext expressed as a polynomial and comprising:
a first stage circuit to a K-th stage circuit configured to perform an NTT (Number Theoretic Transform) operation on the first input encryption data, wherein the first stage circuit to the K-th stage circuit are connected in series; and
a first assist circuit configured to generate a first enable signal to a K-th enable signal based on a degree of the polynomial of the first input encryption data, wherein the first enable signal to the K-th enable signal enable the first stage circuit to the K-th stage circuit, respectively;
wherein each of the first stage circuit to the K-th stage circuit comprises:
a butterfly operator configured to perform a butterfly operation on the first input encryption data or corresponding output encryption data of a previous stage circuit when the corresponding enable signal among the first enable signal to the K-th enable signal indicates a first logical value; and
a bypass circuit configured to bypass the first input encryption data or the corresponding output encryption data of the previous stage circuit when the corresponding enable signal among the first enable signal to K-th enable signal indicates a second logical value;
a processor configured to control operation of the homomorphic encryption computing device to perform operations on the first input encryption data;
wherein the degree of the polynomial of the first input encryption data is a natural number less than or equal to $2^K$; and
wherein K is a natural number.

2. The apparatus of claim 1, wherein the degree of the polynomial of the first input encryption data is N,
wherein N is $2^M$, and
wherein M is an integer more than or equal to 0 and less than or equal to K.

3. The apparatus of claim 2, wherein, based on the degree of the polynomial of the first input encryption data, the first assist circuit is further configured to:
set each logical value of a (K−M+1)-th enable signal to the K-th enable signal among the first enable signal to the K-th enable signal to the first logical value, wherein, when M is 0, an enable signal having the first logical value is absent from the first enable signal to the K-th enable signal; and
set each logical value of the first enable signal to the (K−M)-th enable signal to the second logical value, wherein, when M is K, an enable signal having the second logical value is absent from the first enable signal to the K-th enable signal.

4. The apparatus of claim 1, wherein the first stage circuit includes:
a first logic circuit configured to generate a first logic operation signal based on an AND operation of the first enable signal and the first input encryption data;
a first weight buffer circuit configured to receive first weight data corresponding to the first input encryption data from the first assist circuit;
a first data buffer circuit configured to receive the first logic operation signal from the first logic circuit;
a first butterfly operator configured to receive the first logic operation signal from the first logic circuit, to receive the first weight data from the first weight buffer circuit, and to generate a first butterfly operation signal corresponding to the first logic operation signal and the first weight data based on communication with the first data buffer circuit;
a first bypass circuit configured to receive the first input encryption data; and
a first multiplexer configured to receive the first butterfly operation signal from the first butterfly operator and to receive the first input encryption data from the first bypass circuit:
wherein, when the first enable signal has the first logical value, the first multiplexer outputs the first butterfly operation signal as first output encryption data to the second stage circuit among the first stage circuit to the K-th stage circuit; and
wherein, when the first enable signal has the second logical value, the first multiplexer outputs the first input encryption data as the first output encryption data to the second stage circuit.

5. The accelerator apparatus of claim 4, wherein the second stage circuit includes:
a second logic circuit configured to generate a second logic operation signal based on an AND operation of the second enable signal among the first enable signal to the K-th enable signal and the first output encryption data;

a second weight buffer circuit configured to receive second weight data corresponding to the first output encryption data from the first assist circuit;

a second data buffer circuit configured to receive the second logic operation signal from the second logic circuit;

a second butterfly operator configured to receive the second logic operation signal from the second logic circuit, to receive the second weight data from the second weight buffer circuit, and to generate a second butterfly operation signal corresponding to the second logic operation signal and the second weight data based on communication with the second data buffer circuit;

a second bypass circuit configured to receive the first output encryption data; and a second multiplexer configured to receive the second butterfly operation signal from the second butterfly operator and to receive the first output encryption data from the second bypass circuit;

wherein, in response to that the second enable signal has the first logical value, the second multiplexer outputs the second butterfly operation signal as second output encryption data to the third stage circuit among the first stage circuit to the K-th stage circuit; and wherein, when the second enable signal has the second logical value, the second multiplexer outputs the first output encryption data as the second output encryption data to the third stage circuit.

6. The apparatus of claim 1, wherein the first stage circuit to the K-th stage circuit and the first assist circuit constitute an NTT modular multiplier.

7. The apparatus of claim 1, further comprising:

an NTT modular multiplier including a plurality of parallel processing elements, each configured to generate one of a plurality of parallel signals and a combination element configured to generate a combination signal based on a result of combining the plurality of parallel signals;

wherein each of the plurality of parallel processing elements includes the first stage circuit to the K-th stage circuit and the first assist circuit.

8. The apparatus of claim 1, further comprising:

a (K+1)-th stage circuit to a 2K-th stage circuit configured to perform an INTT (Inverse Number Theoretic Transform) operation of second input encryption data including a polynomial of a homomorphic ciphertext, wherein the (K+1)-th stage circuit to the 2K-th stage circuit are connected in series; and a second assist circuit configured to generate a (K+1)-th enable signal to a 2K-th enable signal based on a degree of the polynomial of the second input encryption data, wherein the (K+1)-th enable signal to the 2K-th enable signal correspond to the (K+1)-th stage circuit to the 2K-th stage circuit, respectively;

wherein each of the (K+1)-th stage circuit to the 2K-th stage circuit is configured to:

a butterfly operator configured to perform a butterfly operation on the second input encryption data or corresponding output encryption data of a previous stage circuit when the corresponding enable signal among the (K+1)-th enable signal to the 2K-th enable signal indicates the first logical value; and a bypass circuit configured to bypass the second input encryption data or the corresponding output encryption data of the previous stage circuit when the corresponding enable signal among the (K+1)-th enable signal to the 2K-th enable signal indicates the second logical value; and wherein the degree of the polynomial of the second input encryption data is a natural number less than or equal to 2K.

9. The apparatus of claim 8, wherein operations of the first stage circuit to the K-th stage circuit correspond to operations of the (K+1)-th stage circuit to the 2K-th stage circuit in an inverse order.

10. The apparatus of claim 8, further comprising:

an NTT modular multiplier including a plurality of parallel processing elements, each configured to generate one of a plurality of parallel signals and a combination element configured to generate a combination signal based on a result of combining the plurality of parallel signals; and an INTT modular multiplier including a plurality of inverse-parallel processing elements, each configured to generate one of a plurality of inverse-parallel signals and an inverse-combination element configured to generate an inverse-combination signal based on a result of combining the plurality of inverse-parallel signals;

wherein each of the plurality of parallel processing elements includes the first stage circuit to the K-th stage circuit and the first assist circuit; and wherein each of the plurality of inverse-parallel processing elements includes the (K+1)-th stage circuit to the 2K-th stage circuit and the second assist circuit.

11. An apparatus comprising:

a homomorphic encryption computing device comprising:

an accelerator configured to receive input encryption data including homomorphic ciphertext expressed as a polynomial and comprising:

a first stage circuit to a K-th stage circuit configured to perform an INTT (Inverse Number Theoretic Transform) operation on the input encryption data, wherein the first stage circuit to the K-th stage circuit are connected in series; and an assist circuit configured to generate a first enable signal to a K-th enable signal based on a degree of the polynomial of the input encryption data, wherein the first enable signal to the K-th enable signal enable the first stage circuit to the K-th stage circuit respectively;

wherein each of the first stage circuit to the K-th stage circuit comprises:

a butterfly operator configured to perform a butterfly operation on the input encryption data or corresponding output encryption data of a previous stage when the corresponding enable signal among the first enable signal to the K-th enable signal indicates a first logical value; and a bypass circuit configured to bypass the input encryption data or the corresponding output encryption data of the previous stage when the corresponding enable signal among the first enable signal to K-th enable signal indicates a second logical value;

a processor configured to control operation of the homomorphic encryption computing device to perform operations on the input encryption data;

wherein the degree of the polynomial of the input encryption data is a natural number less than or equal to $2^K$; and wherein K is a natural number.

12. The apparatus of claim 11, wherein the degree of the polynomial of the first input encryption data is N, wherein N is $2^M$, and wherein M is an integer more than or equal to 0 and less than or equal to K.

13. The apparatus of claim 12, wherein, based on the degree of the polynomial of the input encryption data, the assist circuit is further configured to:

set each logical value of the first enable signal to the M-th enable signal among the first enable signal to the K-th enable signal to the first logical value, wherein when M is 0, an enable signal having the first logical value is absent from the first enable signal to the K-th enable signal; and set each logical value of the (M+1)-th enable signal to the K-th enable signal to the second logical value, wherein when M is K, an enable signal having the second logical value is absent from the first enable signal to the K-th enable signal.

14. The accelerator apparatus of claim 11, wherein the K-th stage circuit includes:

a K-th logic circuit configured to generate a K-th logic operation signal based on an AND operation of the K-th enable signal and (K−1)-th output data of the (K−1)-th stage circuit;

a K-th weight buffer circuit configured to receive K-th weight data corresponding to the (K−1)-th output data from the assist circuit;

a K-th data buffer circuit configured to receive the K-th logic operation signal from the K-th logic circuit;

a K-th butterfly operator configured to receive the K-th logic operation signal from the K-th logic circuit, to receive the K-th weight data from the K-th weight buffer circuit, and to generate a K-th butterfly operation signal corresponding to the K-th logic operation signal and the K-th weight data based on communication with the K-th data buffer circuit;

a K-th bypass circuit configured to receive the (K−1)-th output data; and a K-th multiplexer configured to receive the K-th butterfly operation signal from the K-th butterfly operator and to receive the (K−1)-th output data from the K-th bypass circuit;

wherein, when the K-th enable signal has the first logical value, the K-th multiplexer outputs the K-th butterfly operation signal as K-th output data;

wherein, when the K-th enable signal has the second logical value, the K-th multiplexer outputs the (K−1)-th output data as the K-th output data; and wherein the K-th output data are final output data of the INTT operation of the input encryption data.

15. The apparatus of claim 11, wherein the (K−1)-th stage circuit includes:

a (K−1)-th logic circuit configured to generate a (K−1)-th logic operation signal based on an AND operation of the (K−1)-th enable signal among the first enable signal to the K-th enable signal and (K−2)-th output data of the (K−2)-th stage circuit among the first stage circuit to the K-th stage circuit;

a (K−1)-th weight buffer circuit configured to receive (K−1)-th weight data corresponding to the (K−2)-th output data from the assist circuit;

a (K−1)-th data buffer circuit configured to receive the (K−1)-th operation signal from the (K−1)-th logic circuit;

a (K−1)-th butterfly operator configured to receive the (K−1)-th logic operation signal from the (K−1)-th logic circuit, to receive the (K−1)-th weight data from the (K−1)-th weight buffer circuit, and to generate a (K−1)-th butterfly operation signal corresponding to the (K−1)-th logic operation signal and the (K−1)-th weight data based on communication with the (K−1)-th data buffer circuit;

a (K−1)-th bypass circuit configured to receive the (K−2)-th output data; and a (K−1)-th multiplexer configured to receive the (K−1)-th butterfly operation signal from the (K−1)-th butterfly operator and to receive the (K−2)-th output data from the (K−1)-th bypass circuit;

wherein, when the (K−1)-th enable signal has the first logical value, the (K−1)-th multiplexer outputs the (K−1)-th butterfly operation signal as the (K−1)-th output data to the K-th stage circuit; and wherein, when the (K−1)-th enable signal has the second logical value, the (K−1)-th multiplexer outputs the (K−2)-th output data as the (K−1)-th output data to the K-th stage circuit.

16. The apparatus of claim 11, wherein the first stage circuit to the K-th stage circuit and the assist circuit constitute an INTT modular multiplier.

17. The apparatus of claim 11, further comprising:

an INTT modular multiplier including a plurality of inverse-parallel processing elements, each configured to generate one of a plurality of inverse-parallel signals and an inverse-combination element configured to generate an inverse-combination signal based on a result of combining the plurality of inverse-parallel signals;

wherein each of the plurality of inverse-parallel processing elements includes the first stage circuit to the K-th stage circuit and the assist circuit.

* * * * *